US011965865B2

(12) United States Patent
Fujita

(10) Patent No.: US 11,965,865 B2
(45) Date of Patent: Apr. 23, 2024

(54) PEAK ANALYZING METHOD AND WAVEFORM PROCESSING DEVICE

(71) Applicant: Shimadzu Corporation, Kyoto (JP)

(72) Inventor: Shin Fujita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 530 days.

(21) Appl. No.: 17/167,503

(22) Filed: Feb. 4, 2021

(65) Prior Publication Data
US 2021/0293763 A1  Sep. 23, 2021

(30) Foreign Application Priority Data

Mar. 17, 2020  (SG) .......................... 10202002459U

(51) Int. Cl.
G01N 30/86   (2006.01)
G01N 30/72   (2006.01)
G01N 30/02   (2006.01)

(52) U.S. Cl.
CPC ..... *G01N 30/8637* (2013.01); *G01N 30/7233* (2013.01); *G01N 2030/027* (2013.01)

(58) Field of Classification Search
None
See application file for complete search history.

(56) References Cited

U.S. PATENT DOCUMENTS

| | | |
|---|---|---|
| 4,631,687 A | 12/1986 | Kowalski et al. |
| 4,807,148 A | 2/1989 | Lacey |
| 2008/0172186 A1 | 7/2008 | Ito et al. |
| 2009/0121125 A1 | 5/2009 | Meija et al. |
| 2017/0059537 A1 | 3/2017 | Zhang et al. |
| 2019/0162708 A1 | 5/2019 | Yanagisawa et al. |

FOREIGN PATENT DOCUMENTS

| | | |
|---|---|---|
| CN | 104730183 A | 6/2015 |
| JP | S60115829 A | 6/1985 |
| JP | S63308560 A | 12/1988 |
| JP | 2013-171014 A | 9/2013 |
| JP | 2017-083441 A | 5/2017 |

OTHER PUBLICATIONS

Written Opinion dated Jul. 21, 2022, in connection with corresponding Singapore Application No. 10202002459U; 7 pages.
Office Action dated Jun. 6, 2023, in corresponding Japanese Application No. 2021012376; 5 pages.
Office Action dated Jan. 10, 2023, in corresponding Japanese Patent Application No. 2021-012376, 10 pages.

*Primary Examiner* — Daniel S Larkin
(74) *Attorney, Agent, or Firm* — Maier & Maier, PLLC

(57) ABSTRACT

A peak analyzing method for separating overlapping peaks observed in a second signal waveform representing a relationship between a second parameter and a signal intensity into a plurality of individual peaks originating from different factors based on signal patterns observed in a dimension of a first parameter, the method including at least: performing singular value decomposition on an input matrix expressing three-dimensional data to be processed; estimating characteristic orientations within a space spanned by a plurality of basis vectors by performing a geometric analysis on a trajectory defined by a plurality of weighting vectors in an SVD projection space whose number of dimensions is equal to a lowered rank given by a singular value decomposition process; and deconvoluting signal waveforms in a first matrix of a dimension of the first parameter by a transformation matrix.

12 Claims, 22 Drawing Sheets

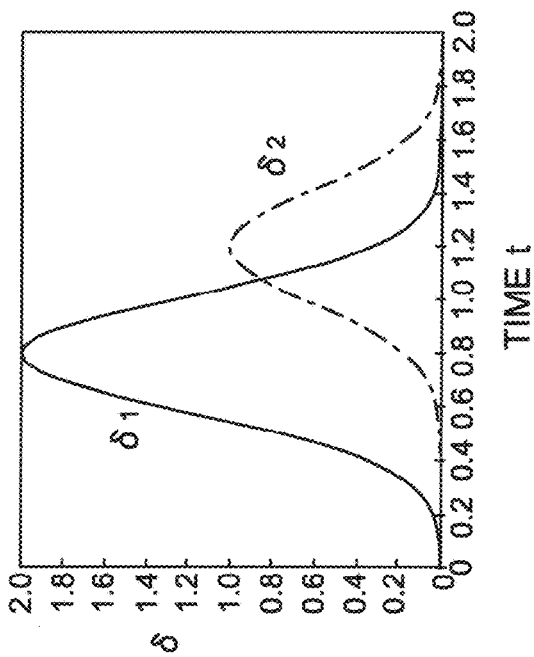
Fig. 4A SPECTRUM
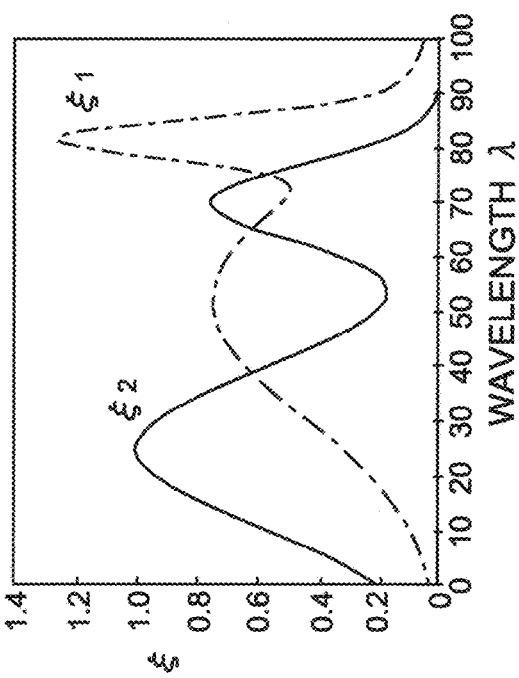
Fig. 4B CHROMATOGRAM
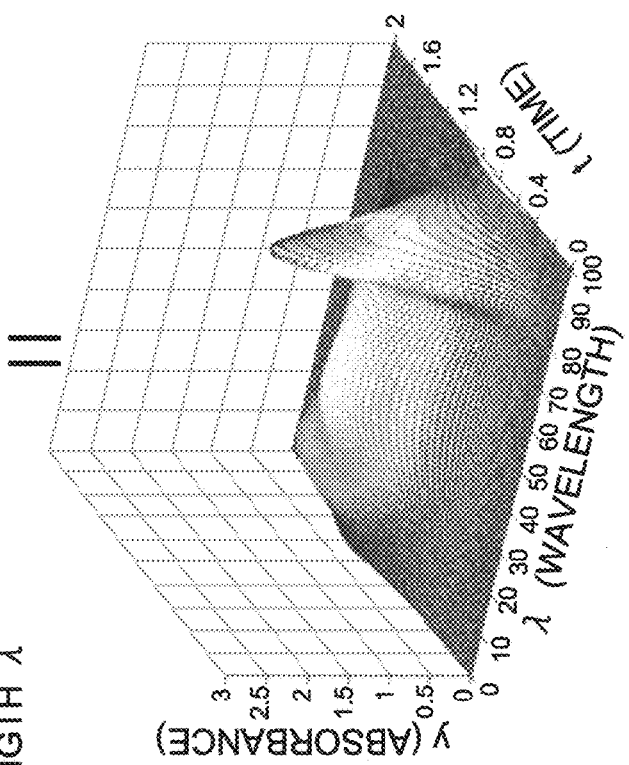
Fig. 4C

NOISE ADDED

Fig. 9
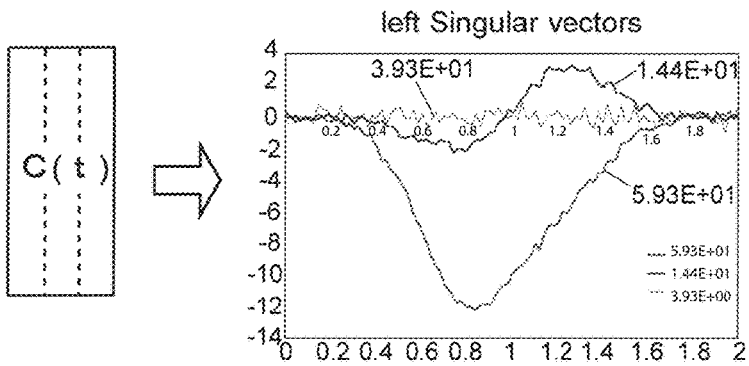
$$C(t) = y(t,\lambda) S(\lambda)$$
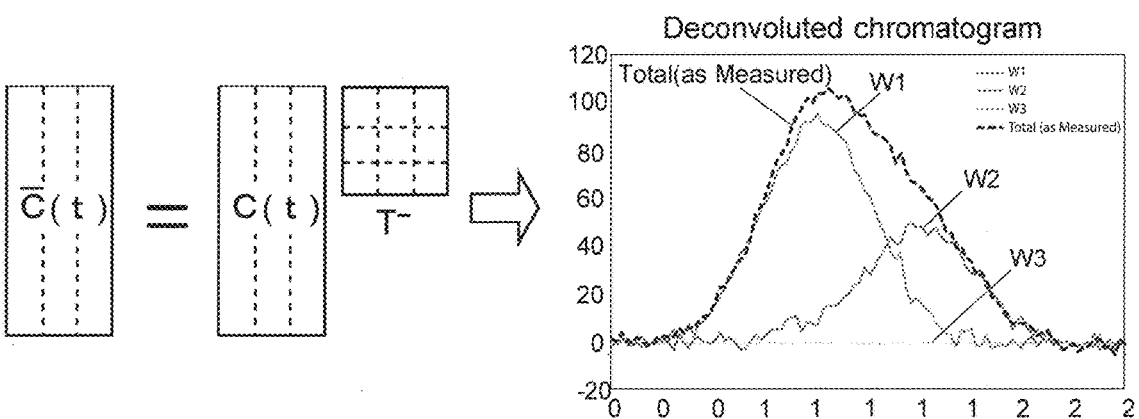

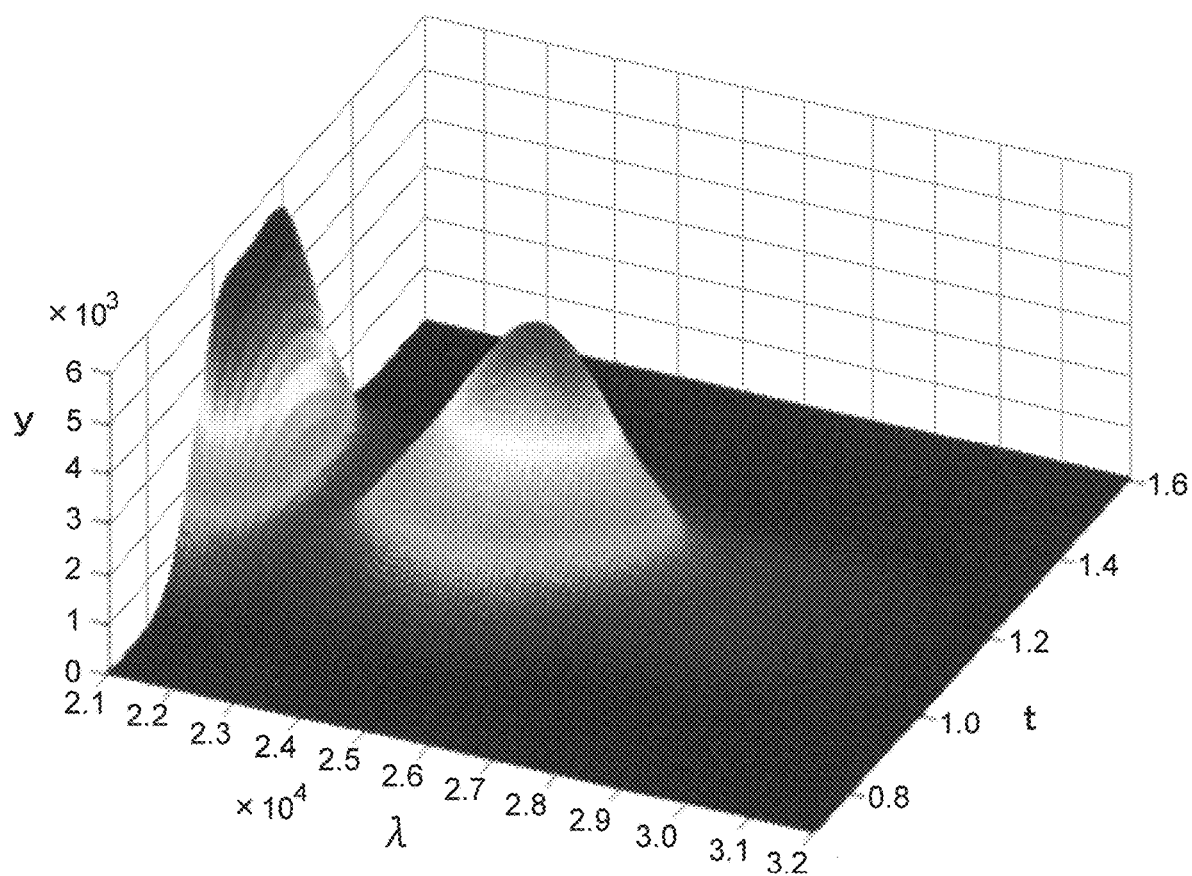

PEAK ANALYZING METHOD AND WAVEFORM PROCESSING DEVICE

FIELD

The present invention relates to a peak analyzing method for examining the purity of a peak in a signal waveform or separating peaks overlapping each other on a signal waveform, as well as a waveform processing device configured to perform a peak analysis by the same method. For example, the present invention is suitable for processing three-dimensional data collected with a liquid chromatograph system employing a photodiode array (PDA) as the detector, a liquid chromatograph mass spectrometer or similar device, to analyze peaks which originate from different components and are observed on a chromatogram waveform or spectrum waveform.

BACKGROUND

In a liquid chromatograph system employing a PDA detector as the detector, various components contained in a sample are temporally separated from each other with a column, and the light absorption characteristics of an eluate containing each separated component are subsequently measured over a predetermined range of wavelengths. Accordingly, such a liquid chromatograph system can repeatedly acquire absorption spectra showing the relationship between the wavelength and absorbance over a predetermined range of measurement time. In the case of a liquid chromatograph mass spectrometer, various components contained in a sample are temporally separated from each other, and a mass spectrometric analysis of an eluate containing each separated component is repeatedly performed over a predetermine range of mass-to-charge ratios. Accordingly, in the liquid chromatograph mass spectrometer, mass spectra showing the relationship between the mass-to-charge ratio and signal intensity (ion intensity) over a predetermined range of measurement time can be repeatedly acquired. The data acquired by such types of measurements are three-dimensional data having three dimensions, i.e. wavelength or mass-to-charge ratio, time, and absorbance or signal intensity.

For example, in the previously described liquid chromatograph system, the qualitative determination of a component in a sample is normally performed based on the retention time (i.e. the position of a peak on a chromatogram) and absorption wavelength (i.e. the position of a peak on an absorption spectrum). On the other hand, the quantitative determination of a component is performed based on the area or height of a peak on a chromatogram. Accordingly, in order to accurately perform the qualitative or quantitative determination of a component, it is essential to correctly detect a peak on a chromatogram and absorption spectrum, and accurately determine relevant values related to the peak, such as the peak-top position, area or height.

If the sample contains a plurality of components whose retention times are close to each other, those components cannot be sufficiently separated and will be introduced into the detector in a mixed form. If the intrinsic absorption wavelengths of those components are close to each other, the peaks corresponding to those components will also overlap each other on an absorption spectrum. That is to say, the peaks originating from the different components will overlap each other on both the absorption spectrum and the chromatogram. Such an overlap of the peaks often occurs in the case of a simultaneous multi-component analysis for a sample containing a large number of components which are similar to each other in chemical structure or nature. Therefore, for a correct qualitative analysis and quantitative analysis, it is extremely important to correctly separate the peaks originating from the different components in the peak detection process.

PATENT LITERATURE

Patent Literature 1: JP 2013-171014 A
Patent Literature 2: JP 2017-083441 A

SUMMARY

Various techniques or algorithms have conventionally been used in order to separate the peaks overlapping each other on a chromatogram or spectrum and detect each individual peak. However, those conventionally and commonly used peak detection methods require various parameters and conditions to be set before the execution of the peak detection or peak separation. Inappropriate setting of those parameters and conditions leads to an inappropriate peak detection or peak separation. Consequently, an important peak may be missed, a peak which actually is not a peak may be incorrectly detected as a peak, or the peak area may significantly deviate from the actual value.

Depending on the peak detection method, an operator may need to make a judgment and manually give instructions for appropriate separation of the peaks. When such a technique is used, the analysis result may possibly vary depending on the individual operator, making it difficult to ensure the reliability or reproducibility of the result. Furthermore, the amount of burden on the operator is significantly large.

A peak which appears to be a single peak on a chromatogram is not always a peak originating from a single component; it may contain an additional component different from the target component. Accordingly, a peak-purity determination process for determining whether or not a given peak is a pure peak originating from a single component has conventionally been performed in some cases (see Patent Literature 1). Although such a peak-purity determination process does not require separating the overlapping peaks, it is necessary to perform peak detection under various parameters and conditions in order to determine whether an apparently single peak has originated from a single component or multiple components. This causes a problem similar to the previously described problem concerning the peak separation.

The present invention has been developed to solve such a problem. Its objective is to provide a peak analyzing method which can satisfactory separate the overlapping peaks or determine the purity of a single peak observed on a chromatogram, spectrum or similar signal waveform, without requiring a significant amount of work for the complex setting of the parameters and manual instructions, as well as a waveform processing device employing the same method.

One mode of the peak analyzing method according to the present invention developed for solving the previously described problem is a peak analyzing method using a computer to process three-dimensional data obtained by acquiring a series of first signal waveforms representing a relationship between a first parameter and a signal intensity for a given set of changing second parameters, and to separate overlapping peaks observed in a second signal waveform representing a relationship between the second parameter and the signal intensity into a plurality of individual peaks originating from different factors based on signal patterns observed in a dimension of the first parameter, wherein the peak analyzing method executing:

- a singular value decomposition step configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition;
- a transformation matrix acquisition step configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and a peak separation step configured to deconvolute signal waveforms in the first matrix of the dimension of the first parameter by the transformation matrix, and to separate peaks in the second signal waveform in the second matrix by the transformation matrix.

Another mode of the peak analyzing method according to the present invention developed for solving the previously described problem is a peak analyzing method using a computer to process three-dimensional data obtained by acquiring a series of first signal waveforms representing a relationship between a first parameter and a signal intensity for a given set of changing second parameters, and to determine a purity of a peak observed in a second signal waveform representing a relationship between the second parameter and the signal intensity, wherein the peak analyzing method executing:

- a singular value decomposition step configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition; and
- a component number estimation step configured to estimate the number of components contributing to the peak from a behavior of a trajectory in an SVD projection space whose number of dimensions is equal to the lowered rank, and which is described by the plurality of weighting vectors.

One mode of the waveform processing device according to the present invention developed for solving the previously described problem is a waveform processing device configured to process three-dimensional data obtained by acquiring a series of first signal waveforms representing a relationship between a first parameter and a signal intensity for a given set of changing second parameters, and to separate overlapping peaks observed in a second signal waveform representing a relationship between the second parameter and the signal intensity into a plurality of individual peaks originating from different factors based on signal patterns observed in a dimension of the first parameter, the waveform processing device including:

- a singular value decomposition processor configured to perform singular value decomposition on an input matrix representing three-dimensional data to be processed, and to determine a first matrix representing a plurality of basis vectors related to the first parameter and a second matrix expressing a plurality of weighting vectors related to the second parameter, where the first matrix and the second matrix have a lowered rank than the input matrix based on singular values obtained by the singular value decomposition;
- a transformation matrix acquirer configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and
- a peak separation calculator configured to deconvolute signal waveforms in the first matrix of the dimension of the first parameter by the transformation matrix, and to separate peaks in the second signal waveform in the second matrix by the transformation matrix.

Another mode of the waveform processing device according to the present invention developed for solving the previously described problem is a waveform processing device configured to process three-dimensional data obtained by acquiring a series of first signal waveforms representing a relationship between a first parameter and a signal intensity for a given set of changing second parameters, and to determine a purity of a peak observed in a second signal waveform representing a relationship between the second parameter and the signal intensity, the waveform processing device including:

- a singular value decomposition processor configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition; and
- a component number estimator configured to estimate a number of components contributing to the peak from a behavior of a trajectory in an SVD projection space whose number of dimensions is equal to the lowered rank, and which is described by the plurality of weighting vectors.

The "SVD projection space" is a low-dimensional space defined by a few basis vectors obtained by performing a singular value decomposition (SVD) analysis on an input matrix expressing three-dimensional data to be processed.

In any of the previously described modes of the peak analyzing method and waveform processing device according to the present invention, for example, the first parameter may be wavelength or mass-to-charge ratio, with the first signal waveform being a waveform spectrum (or wavenumber spectrum) or mass spectrum, while the second parameter may be time, with the second signal waveform being a chromatogram. The different factors may be different components contained in a sample.

Three-dimensional data which show a signal intensity for each combination of one parameter value in the first parameter and one parameter value in the second parameter can be expressed in the form of a matrix. If the contribution of noise is negligible, the rank of this matrix equals the number of components contained in the three-dimensional data. If the contribution of the noise is sufficiently small, the distribution of the singular values acquired by the singular value decomposition normally includes comparatively high values the number of which equals the number of components, while the other values due to the contribution of the noise are close to zero. Therefore, it is possible to estimate the number of components. Accordingly, in one mode of the peak analyzing method and waveform processing device according to the present invention, the number of components contributing to three-dimensional data is estimated from the distribution of the singular values determined for an input matrix expressing the three-dimensional data. In another mode of the peak analyzing method and waveform processing device according to the present invention, low rank approximation of the input matrix (three-dimensional data) is performed so that the number of vectors retained after the singular value decomposition equals the estimated number of components. If random noise is present in the three-dimensional data, the noise will be reduced (removed) by the low rank approximation.

The low rank approximation of the matrix yields a low rank approximate matrix expressed in the form of a product of the first matrix and the second matrix. The weighting vectors which correspond to the columns in the second matrix shows a characteristic behavior in the SVD projection space whose number of dimensions equals the rank of the low rank approximate matrix. As a specific example, consider the case where two peaks originating from two components on the time axis have their respective base portions overlapping each other. If those peaks are observed with the passage of time, a period of time in which only the first peak is present initially appears, followed by a period of time in which the first and second peaks overlap each other, which is further followed by a period of time in which only the second peak is present. The weighting vector in the SVD projection space describes a characteristic trajectory corresponding to the three periods of time: During the period of time in which only the first peak is present, as well as during the period of time in which only the second peak is present, the weighting vectors form a line in a characteristic direction corresponding to the first signal waveform of a single component which corresponds to the peak that is present. Accordingly, in the transformation matrix acquisition step, a geometric analysis is performed on the trajectory to estimate a plurality of characteristic orientation vectors based on the directions of the sections of the trajectory which respectively correspond to those periods of time. A transformation matrix is defined from the set of characteristic orientation vectors. Using this transformation matrix, a set of data in which the peaks are separated can be obtained from each of the first and second matrices.

In one mode of the peak analyzing method and peak processing device according to the present invention, the task of separating peaks overlapping each other on a chromatogram or spectrum to extract information for each individual peak, or the task of accurately determining whether or not an apparently single peak has originated from a single component, can be performed without requiring the setting of complex parameters for the peak detection, peak separation or peak-purity determination, or without requiring a user to make a judgment or perform manual operations. Consequently, an efficient and highly accurate peak separation, peak-purity determination and peak detection can be achieved.

BRIEF DESCRIPTION OF DRAWINGS

FIG. 4A shows a spectrum of one example of a two-component mixture model.

FIG. 4B shows a chromatogram of one example of a two-component mixture model.

FIG. 4C shows three-dimensional data of one example of a two-component mixture model.

FIG. 9 illustrates the transformation of the singular vectors in singular matrices using a transformation matrix determined from a chromatogram trajectory.

FIG. 13 shows three-dimensional data in one example of the three-component mixture model.

DETAILED DESCRIPTION

One example of the peak analyzing method according to the present invention as well as a waveform processing device for carrying out the same method is hereinafter described with reference to the attached drawings.

[Configuration and Schematic Operation of LC System According to Present Embodiment]

Figure 1:
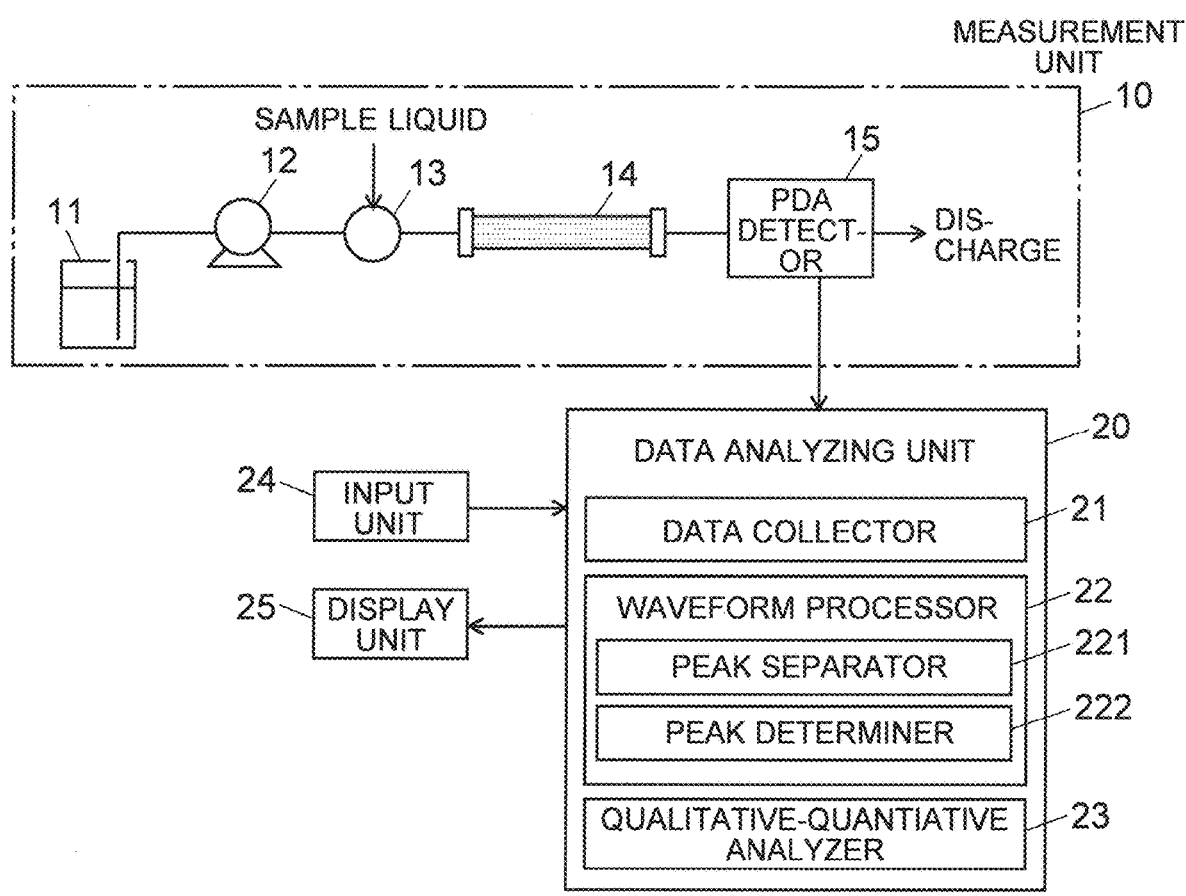
FIG. 1 is a schematic configuration diagram of one embodiment of an LC system employing a waveform processing device according to the present invention.

FIG. 1 is a schematic configuration diagram of one embodiment of an LC system including a waveform processing device according to the present invention.

In this LC system, a measurement unit 10 includes: a mobile phase container 11 in which a mobile phase is stored; a liquid-supply pump 12 configured to draw the mobile phase and supply it at a constant flow velocity; an injector 13 configured to inject a sample into the supplied mobile phase; a column 14 configured to separate the components in the sample in a temporal direction; and a PDA detector 15 configured to detect the components in an eluate coming from the column 14.

The data analyzing unit 20 includes a data collector 21, waveform processor 22, and qualitative-quantitative analyzer 23 as its functional blocks. The waveform processor 22 includes a peak separator 221 and a peak determiner 222 as its sub-functional blocks. An input unit 24 for an analysis operator to perform various input operations, and a display unit 25 for displaying process results and other related information, are connected to the data analyzing unit 20. Most of the functions of the data analyzing unit 20 can be embodied by running, on a personal computer, dedicated data-processing software installed on the same computer.

In the measurement unit 10, the liquid-supply pump 12 draws a mobile phase from the mobile phase container 11 and supplies it through the injector 13 into the column 14. The injector 13 injects a predetermined amount of sample into the mobile phase at a predetermined timing according to an instruction from a controller (not shown). The injected sample is carried by the flow of the mobile phase and introduced into the column 14. While the sample is passing through the column 14, the various components in the sample are separated in the temporal direction. An eluate containing the separated components exits from the outlet port of the column 14 and is introduced into the PDA detector 15. Through not shown, the PDA detector 15 includes a cell through which the eluate flows, a light source, a monochromator configured to wavelength-disperse the light which has passed through the cell, and PDA elements configured to simultaneously detect wavelength-dispersed light.

The light emitted from the light source is cast into the cell. When passing through the eluate flowing through the cell, the light undergoes absorption specific to the component in the eluate. The light which has undergone the absorption is dispersed into component wavelengths by the monochromator, and the component wavelengths of light within a predetermined wavelength range are individually detected by the PDA elements. Accordingly, detection signals which reflect the absorption spectrum over the predetermined wavelength range are almost simultaneously obtained. Under the control of the controller, the PDA detector 15 repeatedly performs such an absorption measurement at predetermined intervals of time. The data collector 21 receives detection signals from the PDA detector 15 and converts them into digital data, and stores the data in a storage section. Thus, a set of three-dimensional data having the three dimensions of time t, wavelength λ and absorbance y (signal intensity) are acquired by the LC measurement for one sample.

The waveform processor 22 performs predetermined processing on the collected three-dimensional data to separate peaks overlapping each other on the chromatogram and absorption spectrum. Subsequently, the waveform processor 22 determines each individual peak and calculates the position of the peak top (retention time and absorption wavelength) and the area (or height) of the peak on the chromatogram. The qualitative-quantitative analyzer 23 performs qualitative determination of the component based on the peak position as well as quantitative determination of the component based on the area or height of the peak. The results of the quantitative and qualitative determination are shown on the display unit 31.

[Peak Separation Method for Two-Component Mixture]

Figure 2:
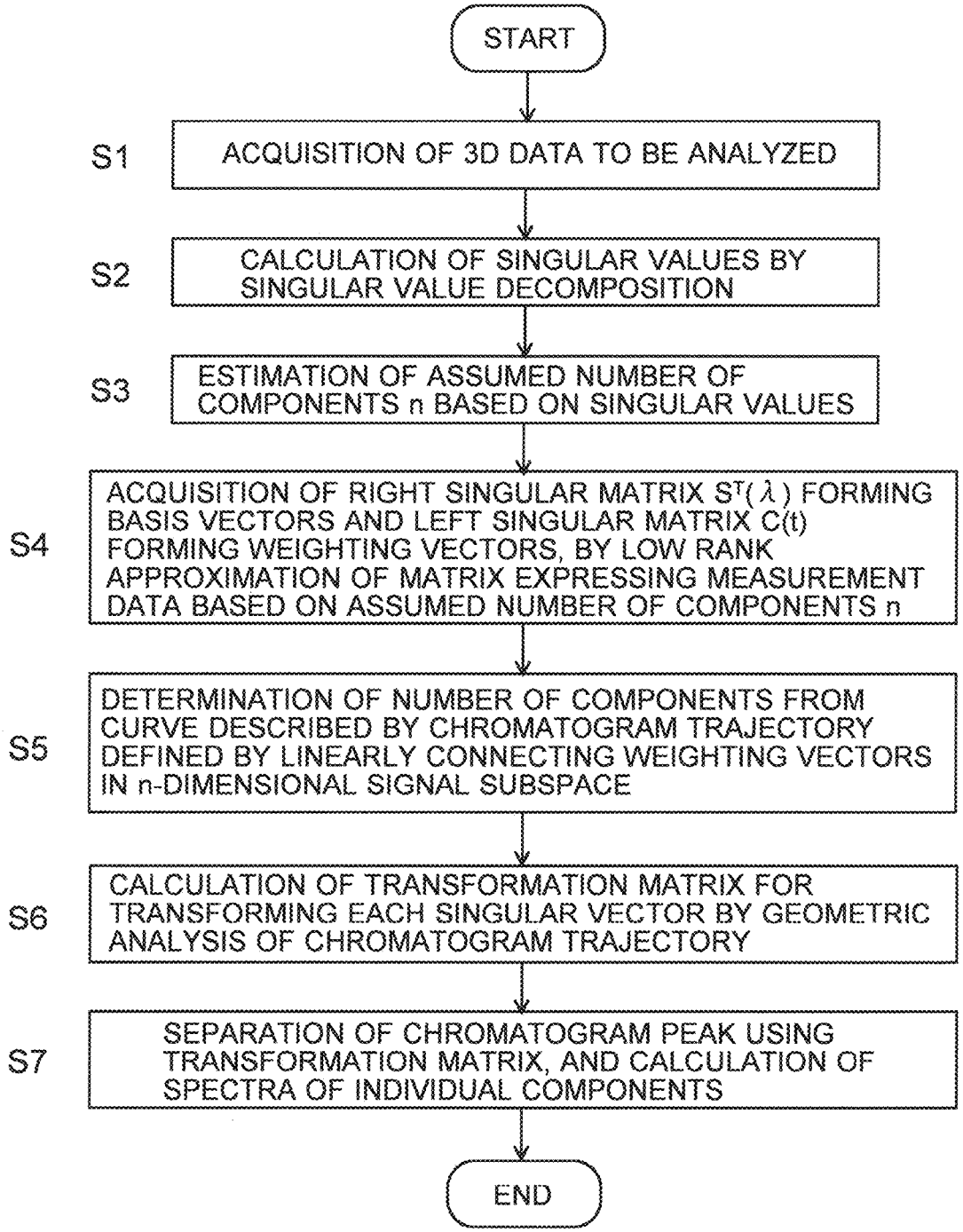
FIG. 2 is a flowchart showing the procedure of a peak separation process in the LC system according to the present embodiment.

With the three-dimensional data stored in the storage section of the data collector 21 in the previously described manner, characteristic waveform processing is carried out, as will be hereinafter described. FIG. 2 is a flowchart showing the procedure of the peak separation process in the LC system according to the present embodiment.

Let p denote the number of components eluted from the column 14 (and introduced into the PDA detector 15) at retention time t. A spectrum $y_s(t, \lambda)$ acquired at retention time t (an "absorption spectrum" is hereinafter simply called a "spectrum") is expressed by the following equation (1):

$$y_s(t,\lambda)=\Sigma \delta_k(t)\xi_k(\lambda) \tag{1}$$

In equation (1), $\Sigma$ is the sum from k=1 to p, $\xi_k(\lambda)$ is the pure spectrum (unit concentration spectrum) of the kth component (k=1 ... p), and $\delta_k(t)$ is the chromatogram of the kth component (a chromatogram at a specific absorption wavelength).

Figure 3:
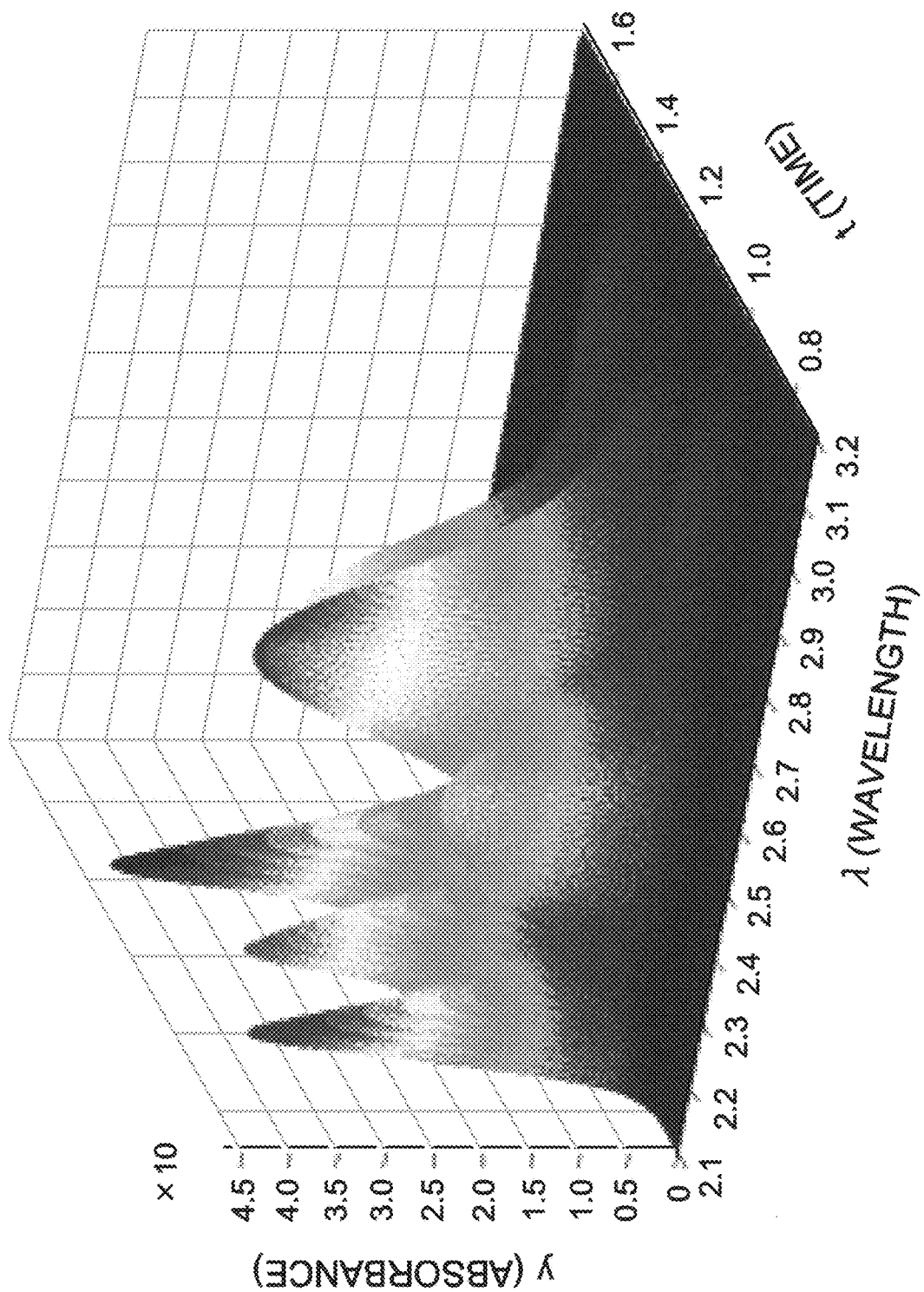
FIG. 3 shows one example of the three-dimensional data collected by an LC measurement.

FIG. 3 shows one example of the three-dimensional data collected by an LC measurement (three-dimensional chromatogram data). Spectrum data $y(t, \lambda)$ which represents the spectrum $y_s(t, \lambda)$ can be expressed in the form of a matrix with M rows (t) and N columns ($\lambda$).

The following descriptions initially consider a two-component mixture model in which the peaks originating from two different components overlap each other in the chromatogram as well as in the spectrum. FIGS. 4A-4C show one example of a two-component mixture model, where FIG. 4A shows the spectra of the two components, FIG. 4B shows the chromatograms of the two components, and FIG. 4C shows three-dimensional data.

Figure 5A:
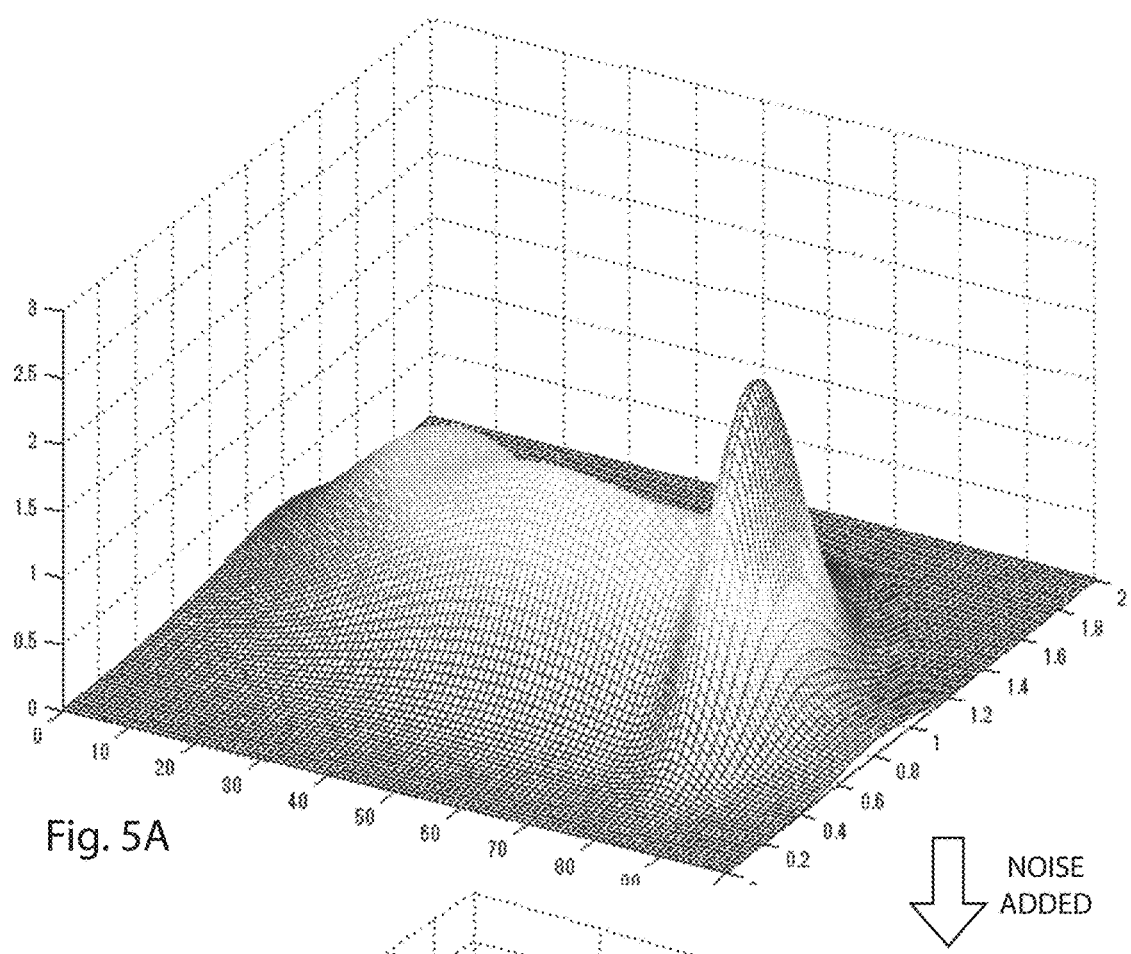
FIG. 5A shows three-dimensional data of the two-component mixture model shown in FIGS. 4A-4C.
Figure 5B:
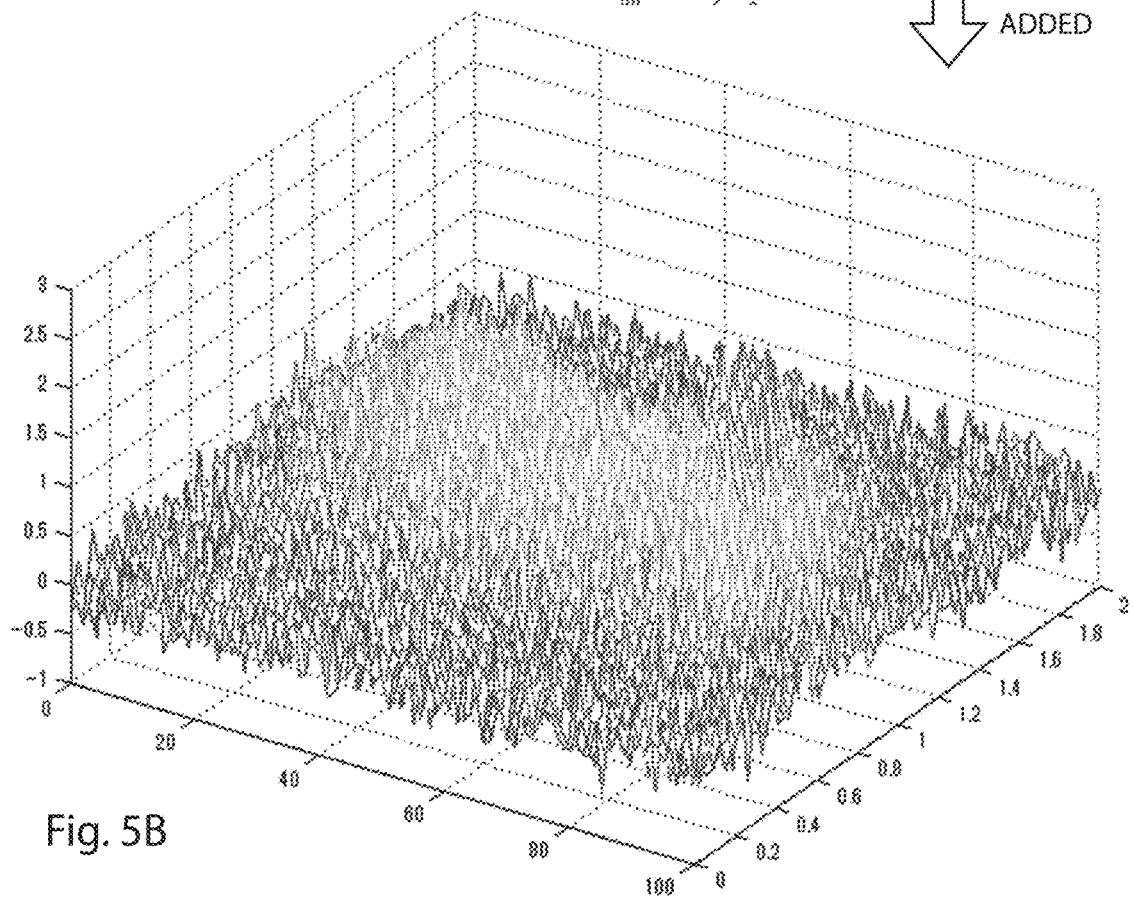
FIG. 5B shows three-dimensional data obtained by adding random noise to the data shown in FIG. 5A.

In an LC measurement, noise components caused by various factors are normally superposed on the measurement data. Accordingly, as shown in FIGS. 5A and 5B, a set of three-dimensional data (FIG. 5B) prepared by adding random noise to the three-dimensional data of the two-component mixture model shown FIG. 4C (FIG. 5A) is considered as the target of the analysis. Understandably, the number of components in the mixture is unknown before the execution of the analysis.

After the initiation of the analyzing process, the peak separator 221 in the waveform processor 22 reads the three-dimensional data to be analyzed from the data collector 21 (Step S1). The peak separator 221 initially performs an analysis for the singular value decomposition (SVD) of the read three-dimensional data (matrix data) (Step S2). Since the singular value decomposition is a matrix computation technique which is often used for extracting singularities in a set of data, detailed descriptions of this technique will be omitted. The singular value decomposition divides the original matrix into three matrices, i.e. a matrix, singular value matrix, and right singular matrix. The singular value matrix contains a plurality of singular values $\sigma_k$.

The singular value decomposition of the three-dimensional data of the noise-added two-component mixture model shown in FIG. 5B yields $\sigma_k$=59.4, 14.7, 4.0, 3.8, 3.7, 3.6, ... as the singular values. Provided that the signal intensity of the target component in the sample is higher than that of the noise to a certain extent, it is possible to consider that singular values showing high values correspond to the target components, while singular values showing low values correspond to noise components. Accordingly, an assumed number of components n contained in the sample is estimated from the values of the calculated singular values $\sigma_k$ (Step S3).

In the previously described example, since there is a significant difference between two singular values of $\sigma_k$=14.7 and $\sigma_k$=4.0, it is reasonable to consider that $\sigma_k$=59.4 and $\sigma_k$=14.7 correspond to two components. However, it is impossible to rule out the possibility that a target component with a low signal intensity is also present. Therefore, the third highest value, $\sigma_k$=4.0, should also be considered as a potential target component. Thus, the three singular values of $\sigma_k$=59.4, $\sigma_k$=14.7 and $\sigma_k$=4.0 are selected for the present. That is to say, the assumed number of components n is estimated at three, and the rank reduction of the matrix is performed for this assumed number.

Figure 6:
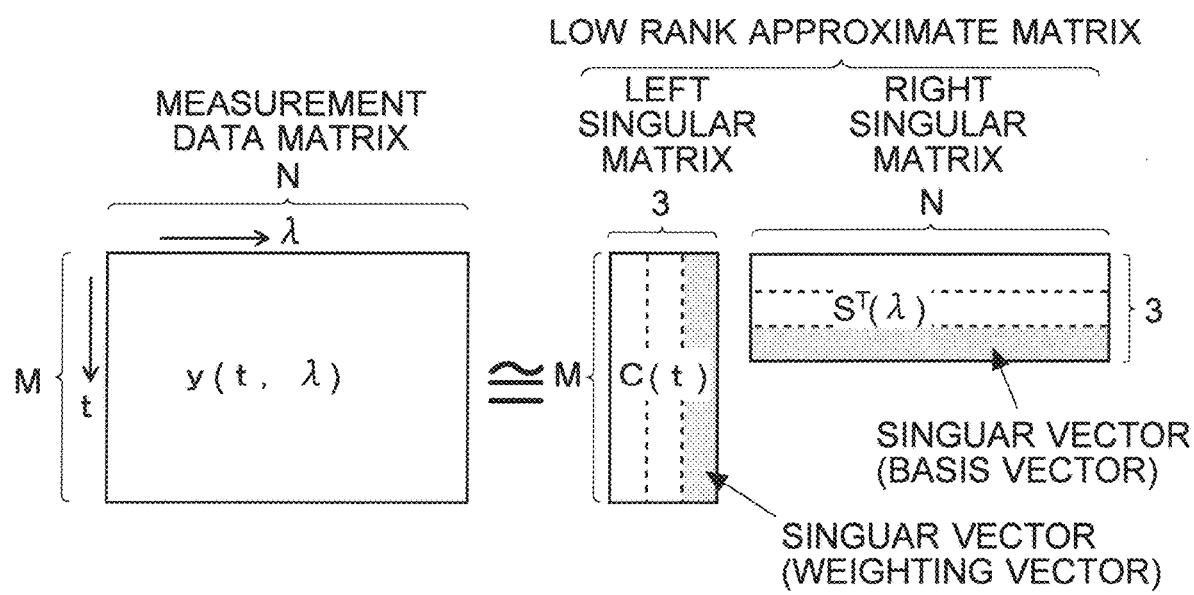
FIG. 6 shows one example of the matrix obtained by the low rank approximation by singular value decomposition.

The peak separator 221 subsequently performs the rank reduction of the matrix expressing the three-dimensional data, based on the analysis result of the singular value decomposition. In the present case, approximate singular matrices are determined so that the number of components is reduced to the assumed rank, i.e. three. As a result, as shown in FIG. 6, the spectrum data $y(t, \lambda)$ expressed by the matrix with M rows and N columns can be approximately expressed as a product of a matrix $C(t)$ with M rows and three columns and a right singular matrix $S^T(\lambda)$ with three rows and N columns. The right singular matrix includes three basis vectors with wavelength $\lambda$ as the variable, while the matrix includes three weighting vectors with time t as the variable (Step S4).

The processing of Steps S2 through S4 is a type of matrix operation commonly known as the low rank approximation of a matrix by singular value decomposition. This processing means that a large number of singular vectors representing the measurement data are deleted except those which correspond to the three main components. In other words, the processing corresponds to a filtering operation for projecting spectrum data $y(t, \lambda)$ onto a subspace spanned by the three main singular vectors $S_k$. This can be expressed by the following equation (2):

$$y_P(t,\lambda)=y(t,\lambda)(SS^T) \quad SS^T=\Sigma S_k S_k^T \tag{2}$$

where $y_P(t, \lambda)$ is the measurement data obtained through the processing.

Figure 7A:
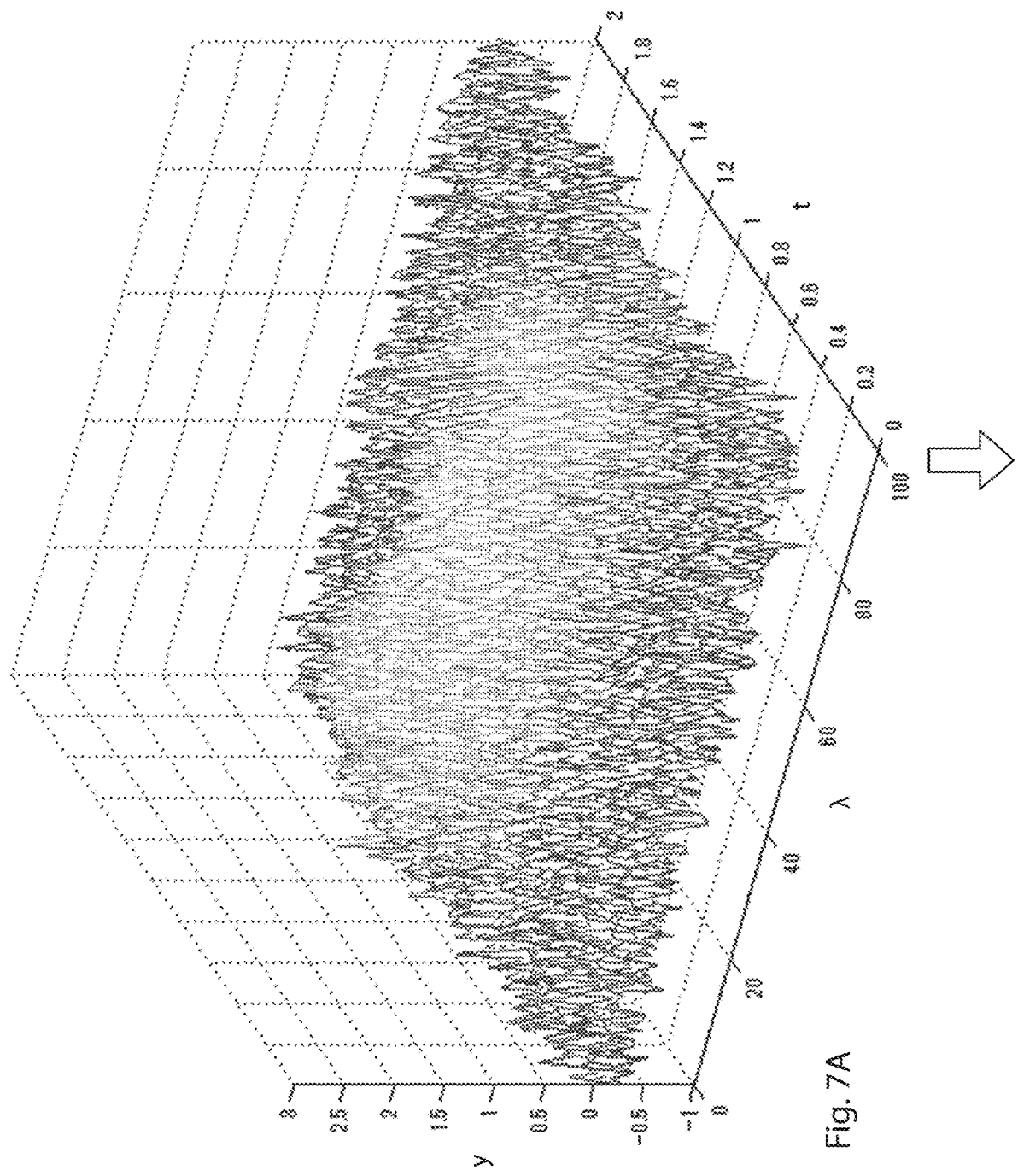
FIG. 7A illustrates the noise reduction effect obtained by performing the low rank approximation by singular value decomposition on the three-dimensional data shown in FIG. 5B.
Figure 7B:
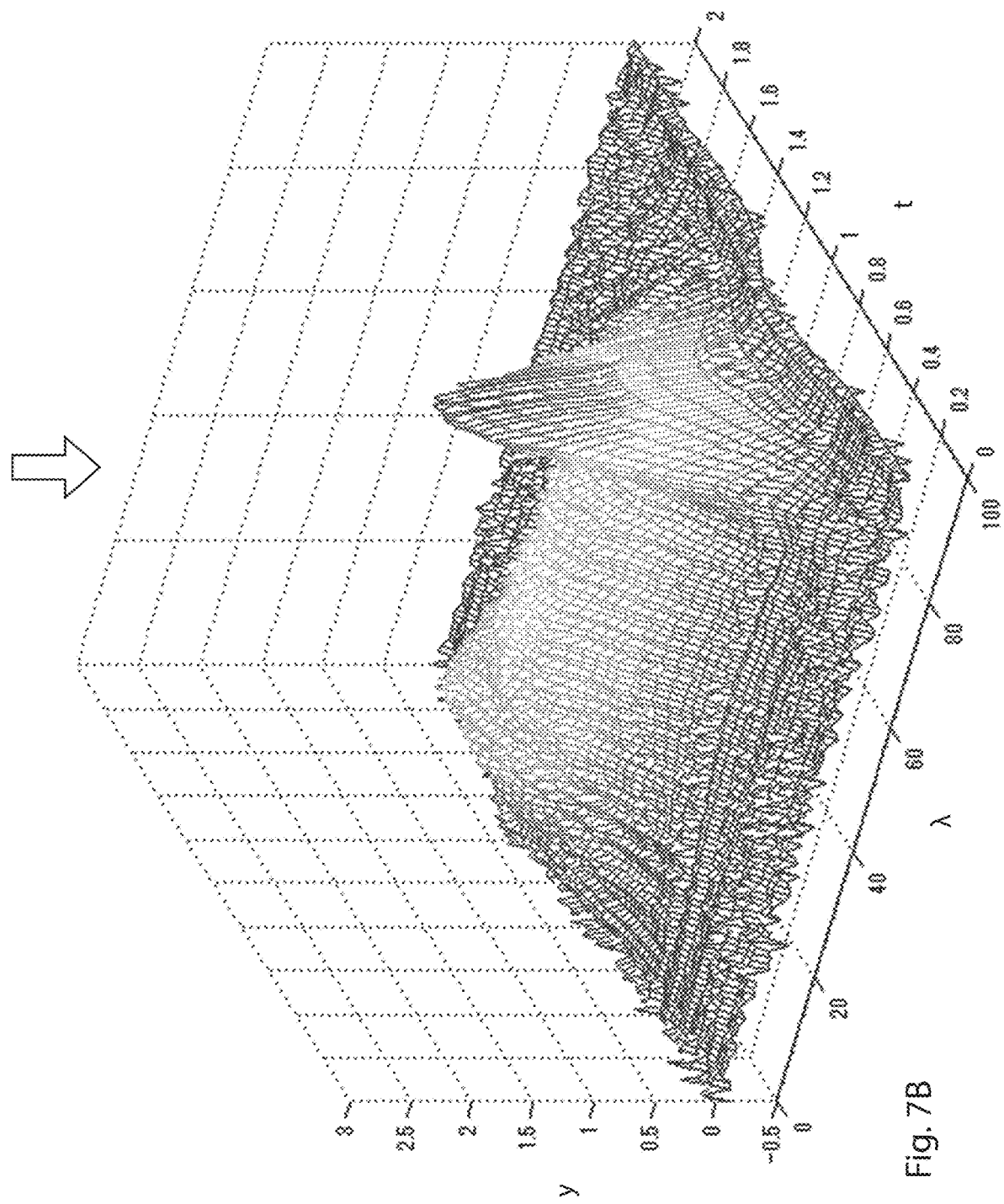
FIG. 7B illustrates the noise reduction effect obtained by performing the low rank approximation by singular value decomposition on the three-dimensional data shown in FIG. 5B.

FIGS. 7A and 7B show the result of the reconstruction of the three-dimensional data using the low rank approximate matrix shown in the previously described example. In the case where the original measurement data contain a considerable amount of noise as shown in FIG. 7A, applying the projection filter to the measurement data significantly reduces the noise, as shown in FIG. 7B. That is to say, the previously described processing is effective for improving the signal-to-noise ratio. This corresponds to the noise removal by the low rank approximation, which is also shown in Patent Literature 2 and other related documents.

A feature of the low rank approximation in the technique according to the present invention exists in that the rank of the data matrix is lowered to the number of components which contribute to the three-dimensional data, i.e. to the lower limit of the rank. The lowering of the number of dimensions to the lower limit, along with the maximization of the noise removal effect, can be achieved by limiting the range of data to be subjected to the signal processing (in the case of an LC system using a PDA detector, the elution period) to specific chromatogram peaks. By comparison, in the conventional method described in Patent Literature 2 and other related documents in which there is no concept of the "number of contributing components", the noise-removal effect has been limited, since the rank-lowering operation cannot be carried out to the lower limit lest it should cause a loss of useful information contained in the original data.

As described earlier, the matrix of the measurement data is divided into two singular matrices. However, the three basis vectors forming the right singular matrix do not correspond to the three single-component spectra. Accordingly, the three weighting vectors forming the matrix are also a mixture of the signals originating from the respective components. Therefore, it is necessary to obtain separate spectra and chromatograms corresponding to the individual components. To this end, attention is hereinafter paid to the matrix $C(t)$ obtained by the singular value decomposition. Each of the singular vectors (weighting vectors) in this matrix is a function of time t. Let the three singular-vector components at each point in time t be considered as one set which gives the coordinates ($C_1$, $C_2$, $C_3$) in the SVD projection space. A curve described by locating a point corresponding to these coordinates at each point in time and connecting the located points with the passage of time t is defined as the "chromatogram trajectory". The SVD projection space is a space whose number of dimensions is equal to the assumed rank (i.e. the assumed number of components) n, which is a three-dimensional space in the present example.

Figure 8A:
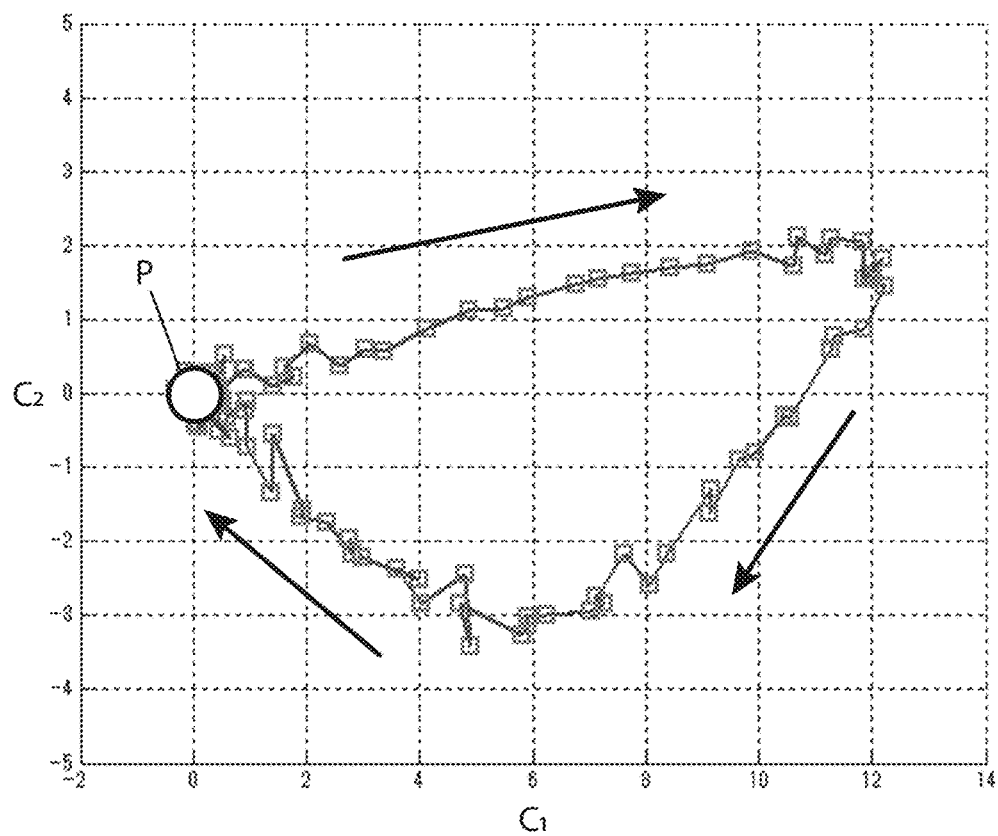
FIG. 8A shows a chromatogram trajectory in an SVD projection space obtained by performing the low rank approximation by singular value decomposition on the three-dimensional data shown in FIG. 5B.
Figure 8B:
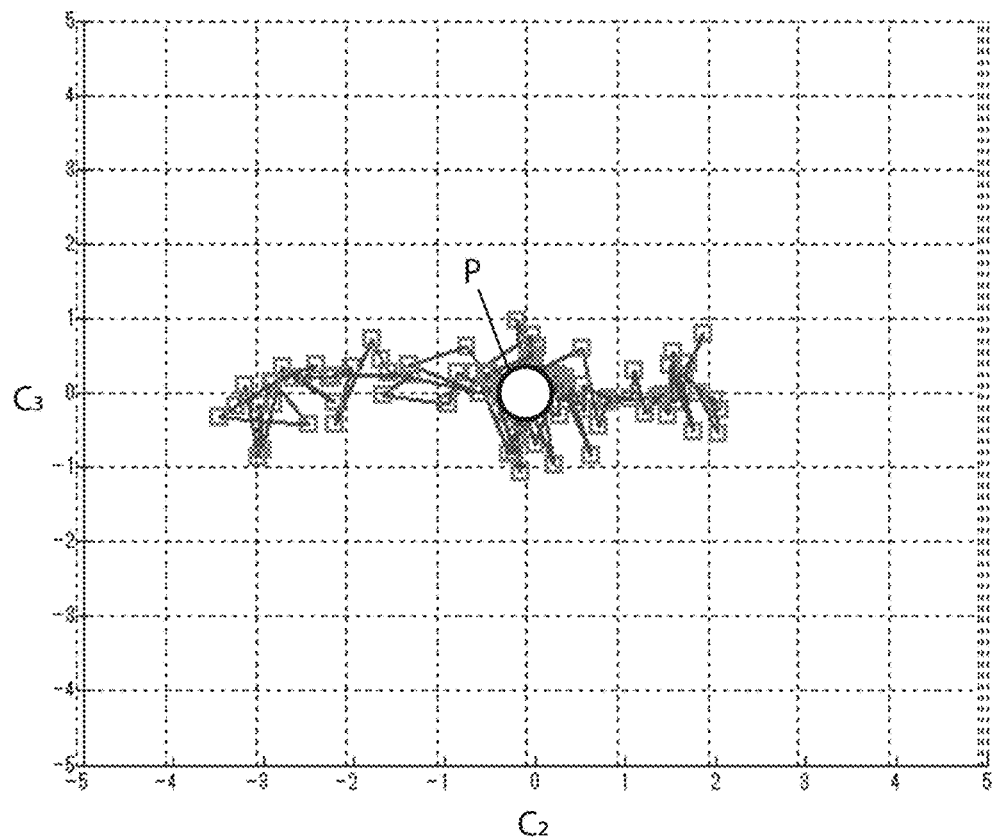
FIG. 8B shows a chromatogram trajectory in an SVD projection space obtained by performing the low rank approximation by singular value decomposition on the three-dimensional data shown in FIG. 5B.
Figure 8C:
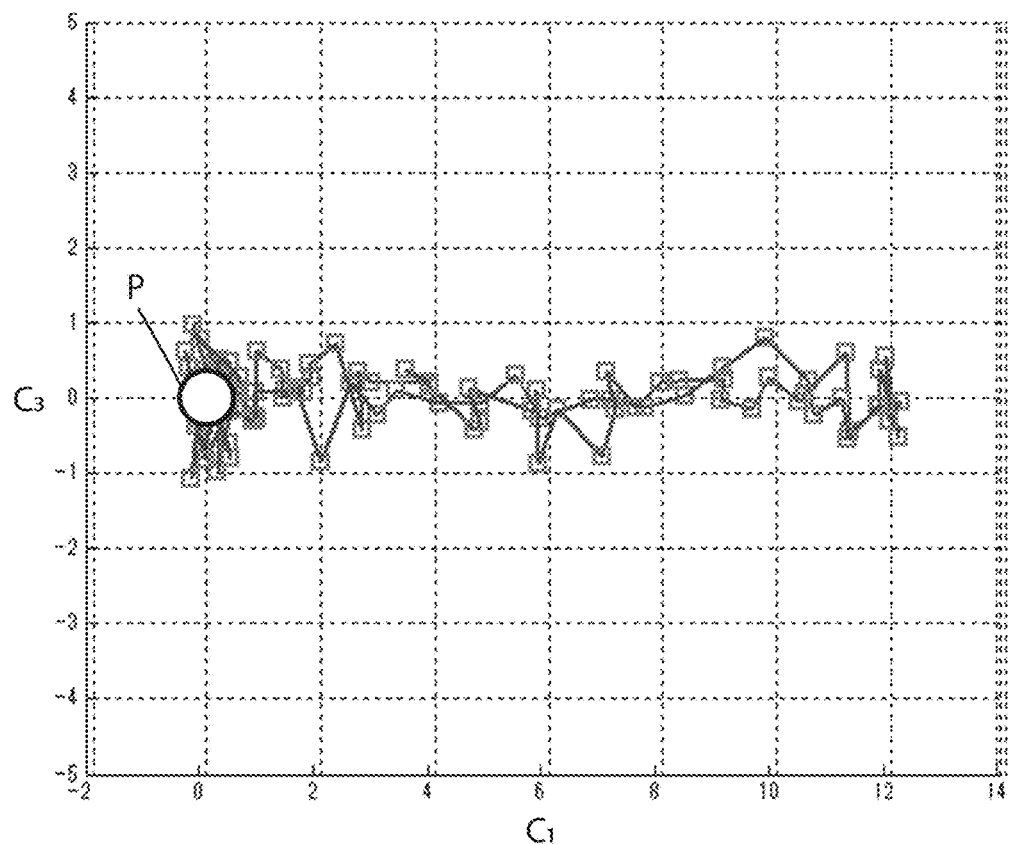
FIG. 8C shows a chromatogram trajectory in an SVD projection space obtained by performing the low rank approximation by singular value decomposition on the three-dimensional data shown in FIG. 5B.
Figure 8D:
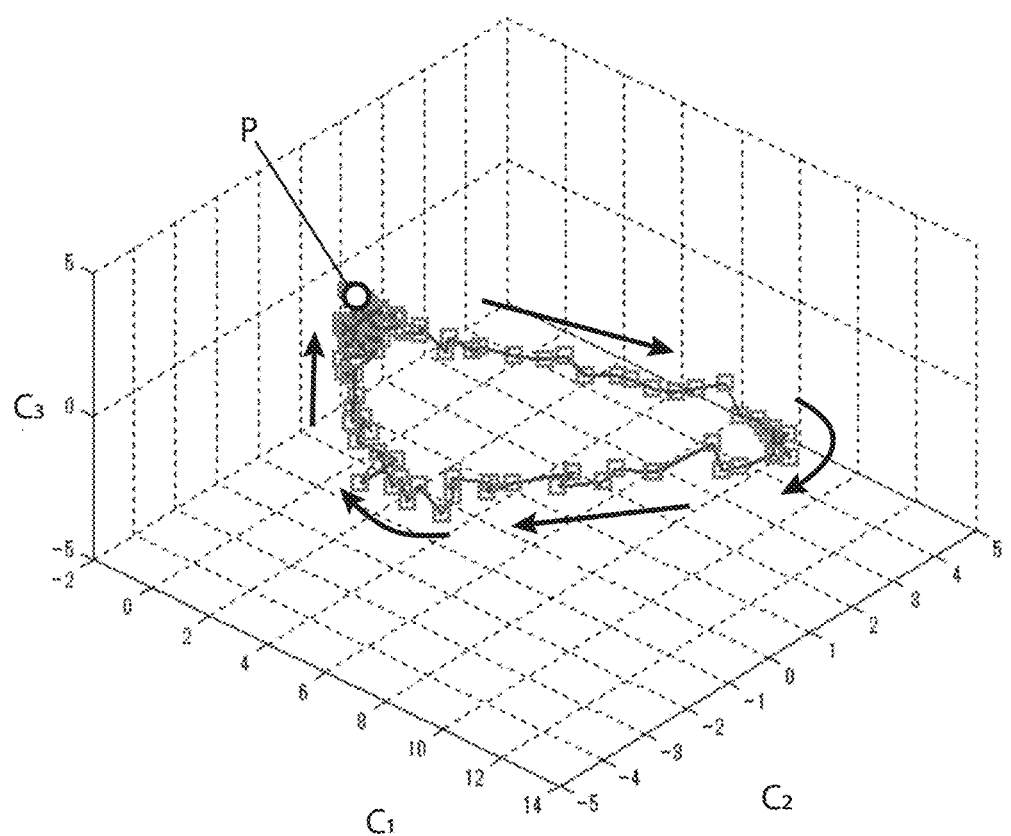
FIG. 8D shows a chromatogram trajectory in an SVD projection space obtained by performing the low rank approximation by singular value decomposition on the three-dimensional data shown in FIG. 5B.

Drawing a chromatogram trajectory in the SVD projection space having the three assumed components $C_1$, $C_2$ and $C_3$ as its axes yields a trajectory that is roughly a curved line starting from point P and returning to the same point P, describing a loop as shown in FIG. 8D. A three-view drawing in which each view has two components as its axes will be as shown in FIGS. 8A-8C.

As shown in FIG. 8A, the chromatogram trajectory evidently describes a loop on the plane with the two axes representing the components $C_1$ and $C_2$, whereas no significant trajectory in the $C_3$ direction can be recognized on the plane with the two axes representing the components $C_2$ and $C_3$, as well as on the plane with the two axes representing the components $C_1$ and $C_3$. From this fact, it is possible to conclude that the component $C_3$ merely contains noise components and is practically insignificant. That is to say, although the number of components in the present example has been assumed to be three based on the determination result of the singular values, it is possible to conclude that only two components are actually significant as judged from the state of the chromatogram trajectory in the SVD projection space. Accordingly, the peak separator 221 concludes that the number of components is two. It should be noted that a chromatogram trajectory obtained from chromatogram signals originating from a pure component (single component) describes a one-dimensional trajectory representing a linear reciprocal movement.

Thus, the correct number of components can be determined from the behavior of the chromatogram trajectory in the SVD projection space. In some cases, the entire processing may be discontinued at the point where the number of components has been determined in this manner, as in the case of simply determining whether or not a peak observed on a chromatogram corresponds to a pure component, i.e. the case where the processing is aimed at determining the purity of the peak.

The peak separation from the three basis vectors (right singular matrix) $S^T(\lambda)$ into the three single-component spectra as well as from three weighting vectors (matrix) $\overline{C}(t)$ into three deconvoluted chromatogram signals is carried out by a mathematical process called the "change of basis" using a transformation matrix T(i, j). As will be hereinafter described, after the components of the transformation matrix have been determined from the characteristic orientations of the chromatogram trajectory, the spectra and deconvoluted chromatogram signals of the individual components are calculated using the same transformation matrix.

Consider a 3×3 transformation matrix T(i, j) for the basis vectors. As shown in FIG. 9, the product of the matrix C(t) and the right singular matrix $S^T(\lambda)$ can be rewritten into a format having the product of the transformation matrix T(i, j) and its inverse matrix $T^{-1}$ sandwiched between the left singular matrix and the right singular matrix. The three weighting vectors forming the left singular matrix C(t), i.e. the singular chromatogram signals, can be expressed in the form of the matrix $\overline{C}(t)$, which consists of the deconvoluted chromatogram signals, multiplied by the transformation matrix T(i, j). Accordingly, the matrix $\overline{C}(t)$ can conversely be obtained by multiplying the left singular matrix C(t) by the inverse matrix $T^{-1}$ of the transformation matrix T. That is to say, the peak separation in the SVD projection space leads to the problem of determining the basis-vector transformation matrix T(i, j).

Figure 10A:
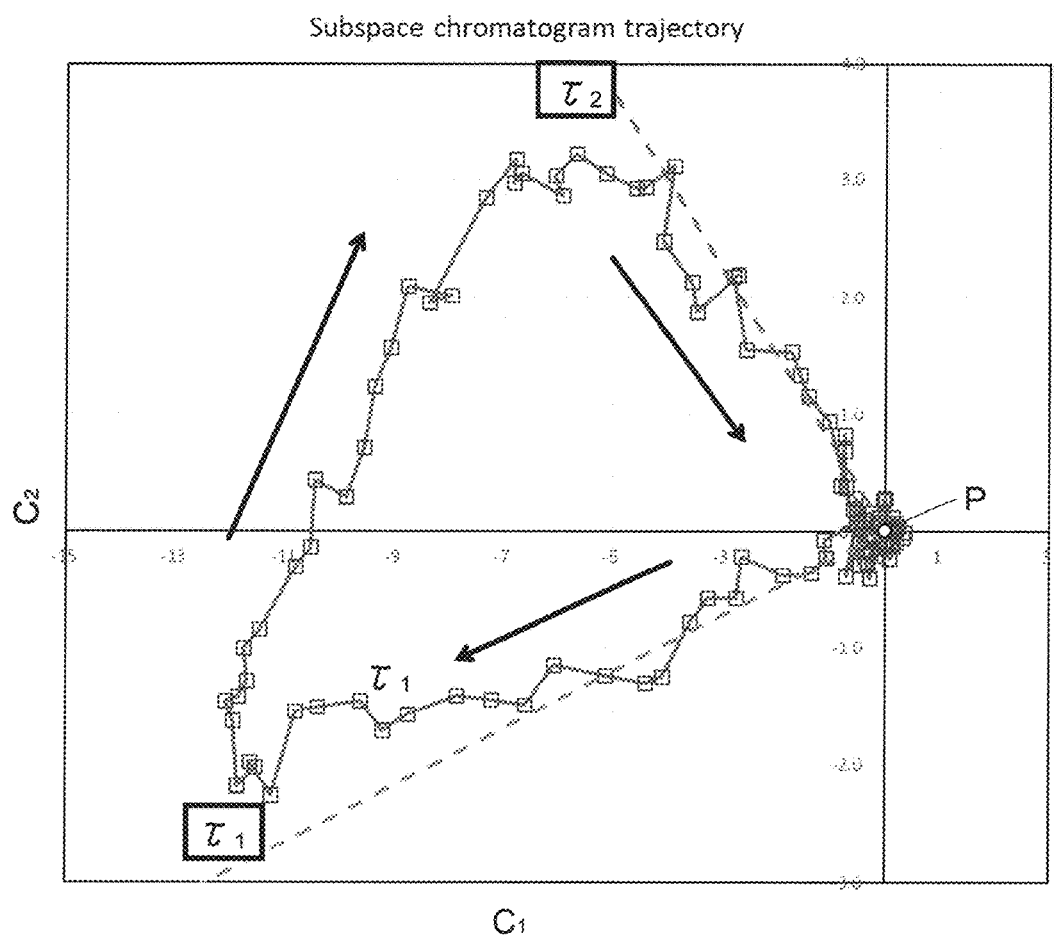
FIG. 10A illustrates a method for calculating a transformation matrix using a chromatogram trajectory002E.
Figure 10B:
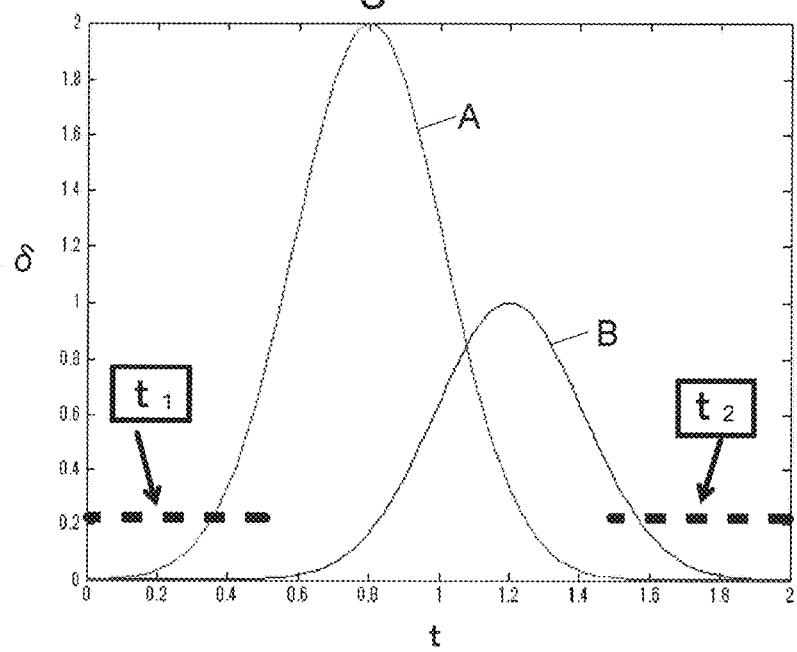
FIG. 10B illustrates a method for calculating a transformation matrix using a chromatogram trajectory002E.

Consider the case where there are two peaks A and B overlapping each other on a chromatogram as shown in FIG. 10B. Except for the case where both peaks completely coincide with each other and the case where one peak is entirely included within the period of the other peak, the period of time corresponding to the entire set of peaks should always include a period of time t1 in which only the peak A is present as well as a period of time t2 in which only the peak B is present. As noted earlier, the singular chromatogram signal forming the left singular matrix C(t) is a mixture of signals originating from a plurality of components. The behavior of the signal should change depending on whether the signal is within the period of time t1 or t2 in which only one peak is present, or within the period of time in which both peaks are present.

FIG. 10A shows a chromatogram trajectory on the two-axis plane of the components $C_1$ and $C_2$. The trajectory starts from point P and returns to the same point P after describing a roughly triangular shape with the passage of time. The three sides of the roughly triangular shape respectively correspond to the period of time t1 in which only the peak A is present, the period of time in which both peaks are present, and the period of time t2 in which only the peak B is present. Accordingly, in the present chromatogram trajectory, the direction of the side corresponding to the period of time t1 indicates the basis vector of the single component corresponding to the peak A (characteristic orientation vector $\tau_1$), while the direction of the side corresponding to the period of time t2 indicates the basis vector of the single component corresponding to the peak B (characteristic orientation vector $\tau_2$). However, as can be seen in FIG. 10A, the chromatogram trajectory is not a triangular shape in the strict sense. Each side is rather curved and not straight. Therefore, it is preferable to determine the directions of the basis vectors corresponding to the two individual components by calculating the direction of the tangent to the curve on each side.

The transformation matrix T(i, j) can be expressed using the components $C_1$, $C_2$ and $C_3$ of the characteristic orientation vectors $\tau_k$ (where k=1, 2, . . . ) calculated in the previously described manner. Since it can be known from FIGS. 8B and 8C that the component $C_3$ merely contains the contribution of noise, this orientation can be left as the noise orientation. In that case, the transformation matrix is given by equation (3):

$$T(i, j) = \begin{pmatrix} \tau_{11} & \tau_{12} & 0 \\ \tau_{21} & \tau_{22} & 0 \\ 0 & 0 & 1 \end{pmatrix} \quad (3)$$

where $\tau_1 = (\tau_{11}\ \tau_{12}\ 0)$ and $\tau_2 = (\tau_{21}\ \tau_{22}\ 0)$. The components of the characteristic orientation vectors $\tau_k$ are directly used as the components of the transformation matrix. If the origin of the component $C_3$ of the SVD projection space is not a noise factor but a contribution of a third component, the third characteristic orientation vector $\tau_3$ will also be obtained, as will be described later. In that case, the third row of the transformation matrix will be given by the three components of $\tau_3 = (\tau_{31}\ \tau_{32}\ \tau_{23})$.

The peak separator 221 geometrically analyzes the chromatogram trajectory in the SVD projection space in the previously described manner to calculate the basis vectors (characteristic orientation vectors) corresponding to the individual components overlapping each other, and create the transformation matrix T(i, j) based on the calculated result (Step S6).

Figure 11A:
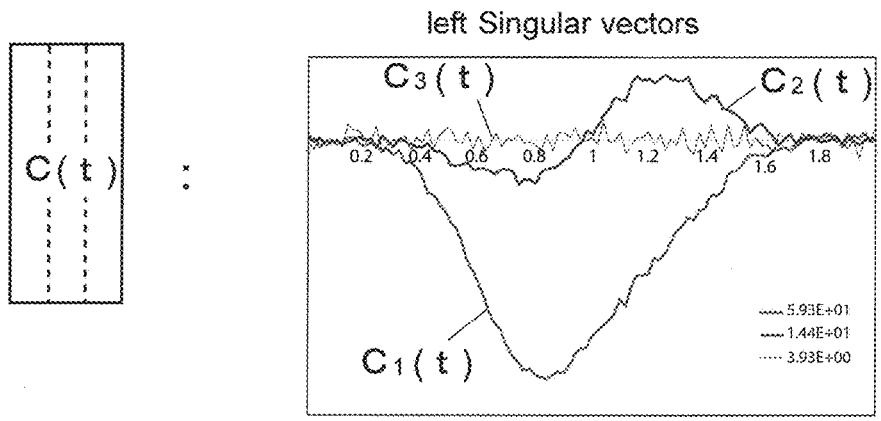
FIG. 11A illustrates the peak separation on a chromatogram using a transformation matrix.
Figure 11B:
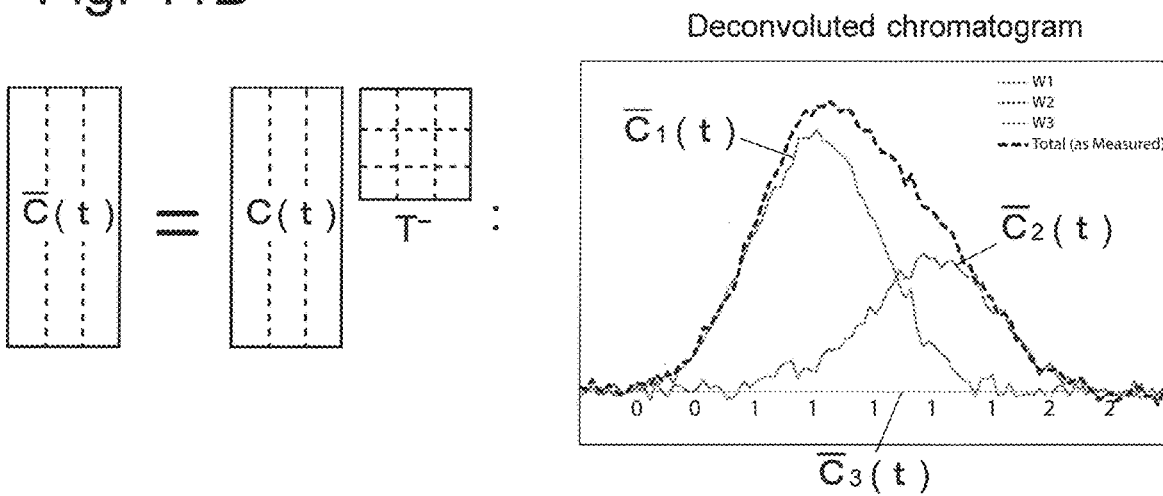
FIG. 11B illustrates the peak separation on a chromatogram using a transformation matrix.
Figure 11C:
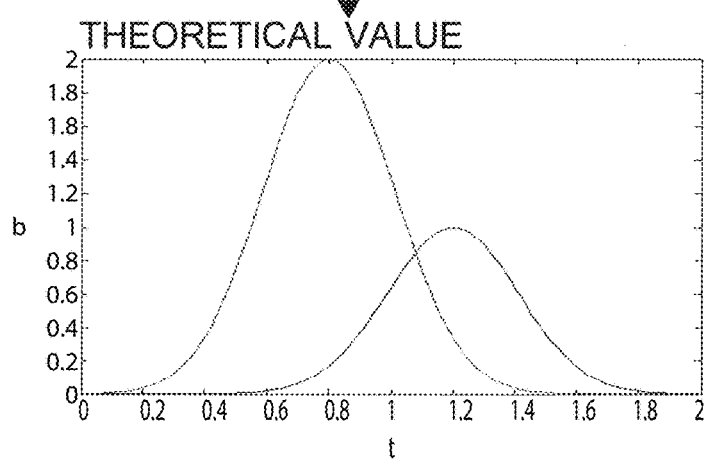
FIG. 11C illustrates the peak separation on a chromatogram using a transformation matrix.
Figure 12A:
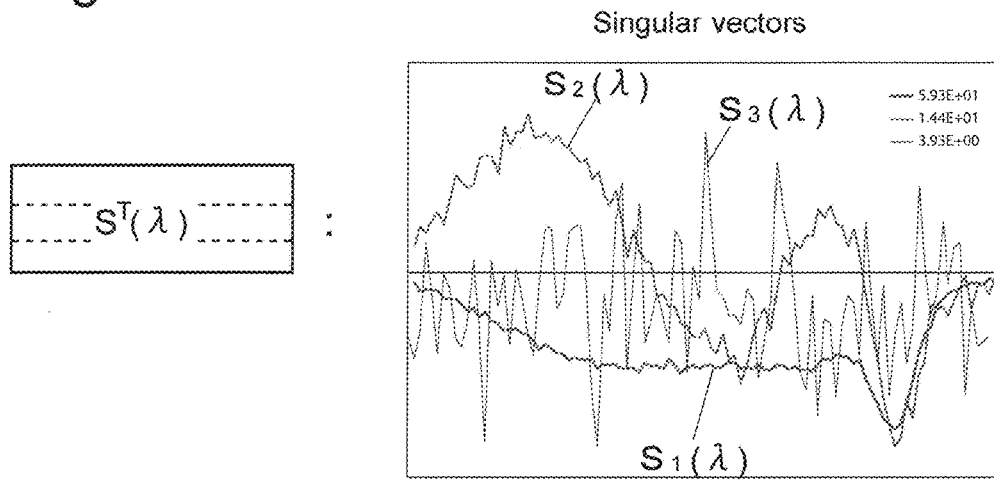
FIG. 12A illustrates the peak separation on a spectrum using a transformation matrix.
Figure 12B:
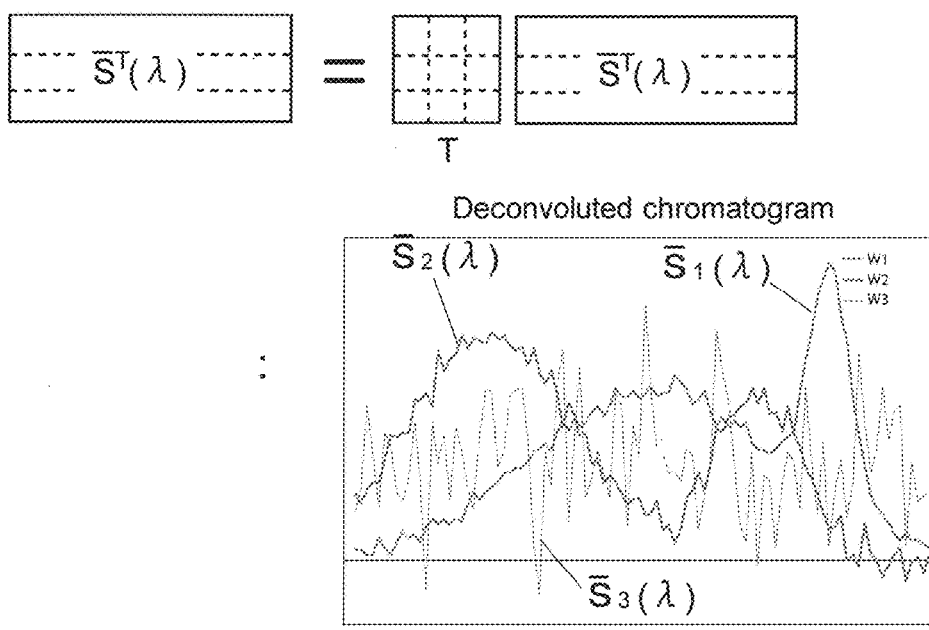
FIG. 12B illustrates the peak separation on a spectrum using a transformation matrix.
Figure 12C:
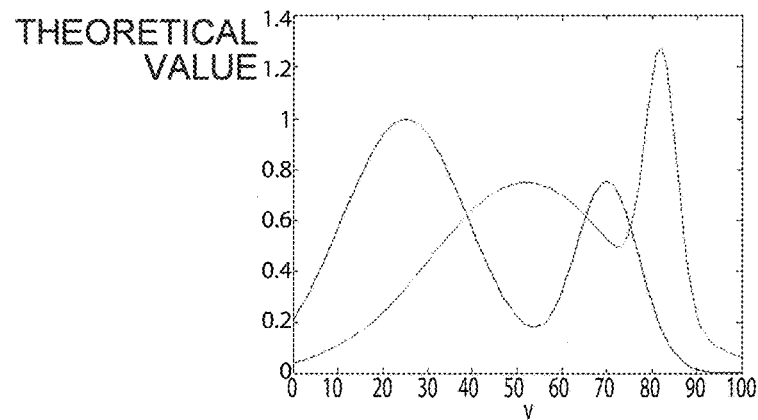
FIG. 12C illustrates the peak separation on a spectrum using a transformation matrix.

After the transformation matrix T(i, j) has been obtained, the matrix $\overline{C}(t)$ formed by deconvoluted chromatogram signals is calculated by multiplying the left singular matrix C(t) by the inverse matrix $T^{-1}$ of the transformation matrix T(i, j), as shown in FIGS. 11A-11C. Meanwhile, a matrix $\overline{S}^T(\lambda)$ formed by the deconvoluted spectrum signals is calculated by multiplying the right singular matrix $S^T(\lambda)$ by the transformation matrix T(i, j), as shown in FIGS. 12A-12C (Step S7).

The deconvoluted chromatogram signals of the two calculated components $\overline{C}_1$ and $\overline{C}_2$ are shown in the right section of FIG. 11B, while the theoretical chromatograms of the two components $\overline{C}_1$ and $\overline{C}_2$ are shown in FIG. 11C. A comparison between the two figures demonstrates that the peak shape on the chromatogram is reproduced to a considerably satisfactory degree. The deconvoluted spectrum signals of the two calculated components $\overline{S}_1^T$ and $\overline{S}_2^T$ are shown in the right section of FIG. 12B, while the theoretical spectrum of the two components $\overline{S}_1^T$ and $\overline{S}_2^T$ are shown in FIG. 12C. A comparison between the two figures demonstrates that the peak shape on the spectrum is also reproduced to a satisfactory degree.

The peak separator 221 in the LC system according to the present embodiment carries out the process of separating the overlapping peaks on the chromatogram and spectrum by the previously described procedure. After the peak separation, the peak determiner 222 determines the peak-top position (retention time) of the peak on the chromatogram, and calculates the peak area. The peak determiner 222 further determines the peak-top position (maximum absorption wavelength) of the peak on the spectrum. The qualitative-quantitative analyzer 23 identifies the component based on the retention time and maximum absorption wavelength, as well as determines the quantity of the identified component from the value of the peak area. Thus, the qualitative and quantitative determination of a plurality of components which have not been sufficiently separated in the column can be appropriately performed.

[Peak Separation Method for Three-Component Mixture]

In the previously described two-component mixture model, two components which respectively originate from two components overlap each other on a chromatogram, and each of those components has a period of time in which the component solely appears. By comparison, in the case where three components are mixed together, it is often the case that a period of time in which only one component appears is present for the first-appearing component A and the third-appearing component C, whereas the second-appearing component B is overlapped with either the component A or component C, or both, during the elution. In the following description, a peak separation method for such a three-component mixture model is considered.

Figure 14A:
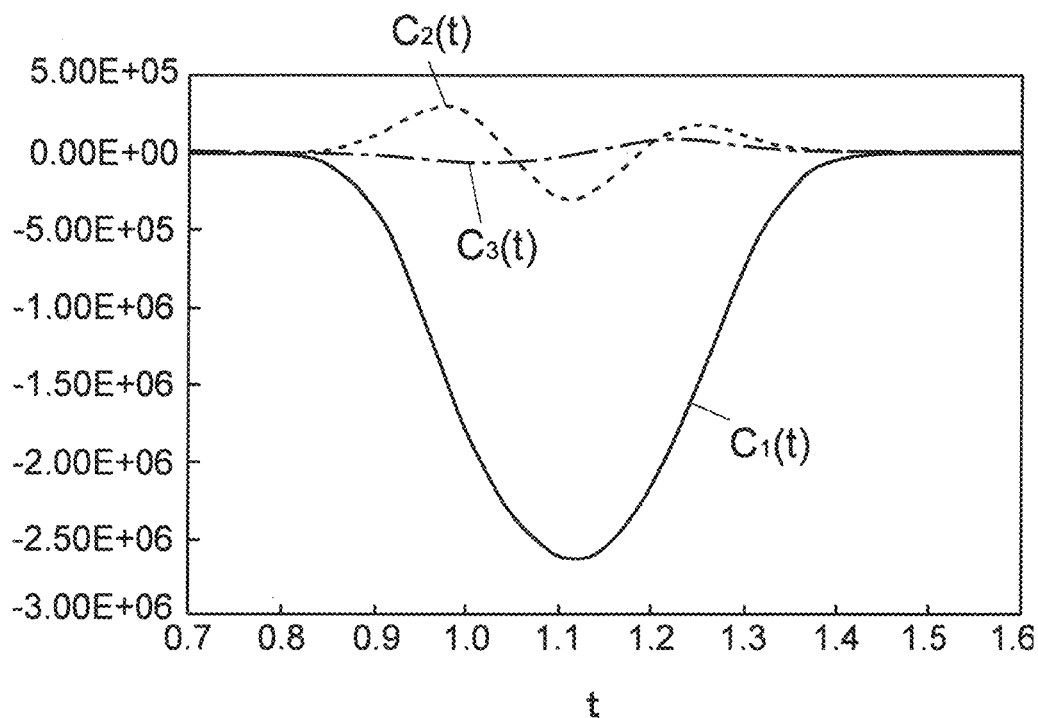
FIG. 14A shows weighting vectors (singular chromatogram signal) forming a matrix, obtained by performing the low rank approximation by singular value decomposition on the three-dimensional data shown in FIG. 13.
Figure 14B:
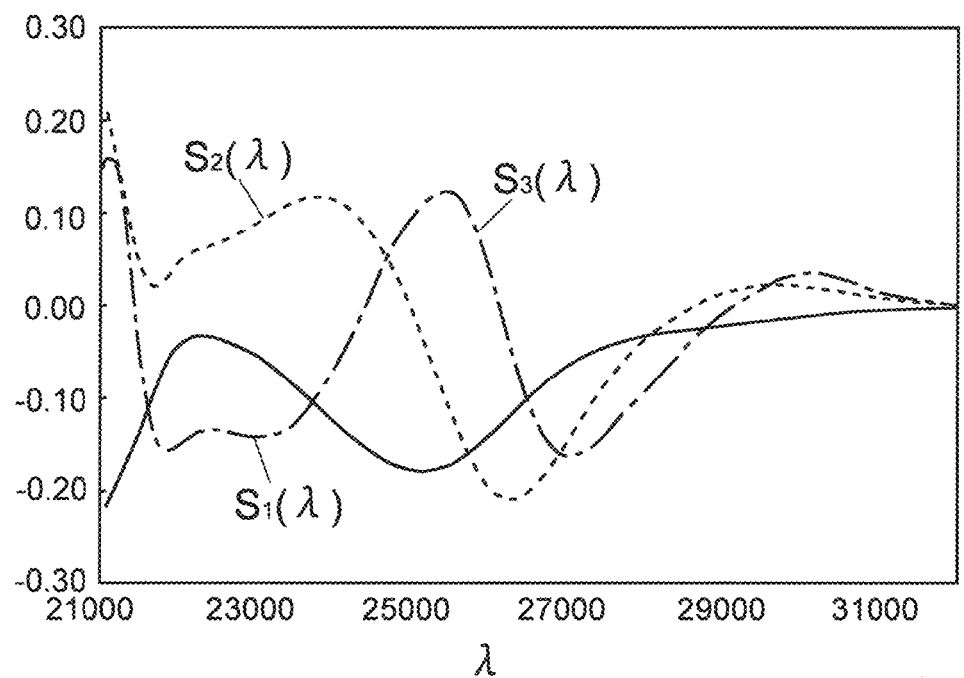
FIG. 14B shows basis vectors (singular spectrum signal) forming a right singular matrix.

FIG. 13 is one example of the three-dimensional data of the three-component mixture model. The low rank approximation by singular value decomposition is performed on those three-dimensional data in the previously described manner, to determine the rank-lowered left singular matrix and right singular matrix. FIG. 14A shows three weighting vectors (singular chromatogram signal) forming the left singular matrix. FIG. 14B shows three basis vectors (singular spectrum signal) forming the right singular matrix.

Figure 15:
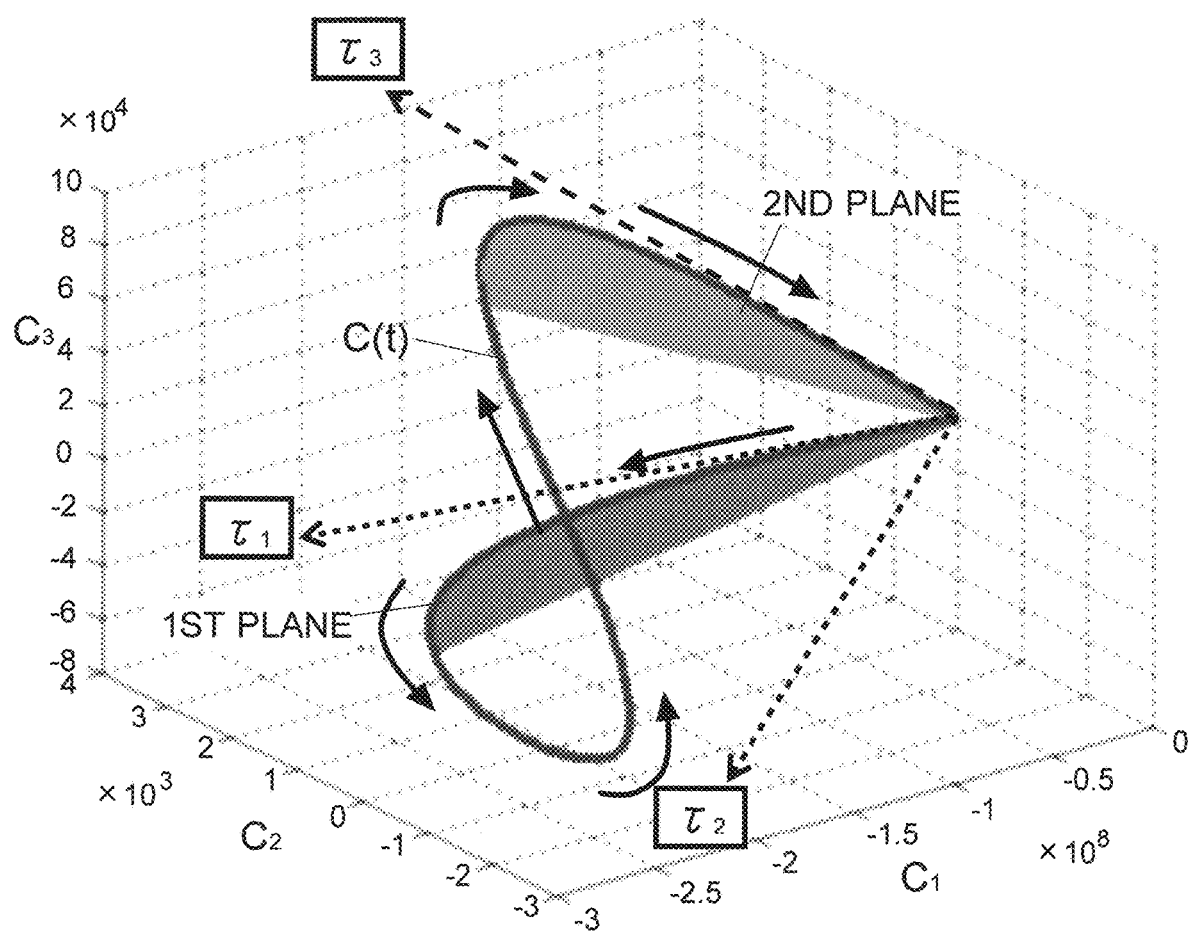
FIG. 15 shows a chromatogram trajectory in an SVD projection space obtained by performing the low rank approximation by singular value decomposition on the three-dimensional data shown in FIG. 13.

FIG. 15 shows a chromatogram trajectory in an SVD projection space obtained by performing the low rank approximation by singular value decomposition. In the case of the two-component mixture, the chromatogram trajectory lies on one plane. In the case of the three-component mixture, the chromatogram trajectory takes a three-dimensional form.

It is hereinafter assumed that the elution periods of the three components overlap each other in such a manner that only the first-eluted component A is eluted for a specific period of time from the beginning of the elution of the component A, while only the third-eluted component C is eluted for a specific period of time until the elution of the component C is completed. In other words, each of the two components A and C has an elution period in which only the single component is eluted. As for the component B, it is assumed that there is an elution period in which the component B is eluted with the component A, as well as an elution period in which the component B is eluted with the component C.

Under such conditions, the directions of the basis vectors (characteristic orientation vectors $\tau_1$ and $\tau_3$) which respectively correspond to the components A and C can be determined from the direction of the tangent to the curve representing the chromatogram trajectory, as in the example of the two-component mixture model. That is to say, in FIG. 15, the tangent to the curve of the chromatogram trajectory starting from point P indicates the direction of the basis vector of the single component A, while the tangent to the curve of the chromatogram trajectory returning to point P indicates the direction of the basis vector of the single component C.

On the other hand, after the completion of the period of time in which only the component A is eluted, the two components A and B are eluted in a mixed form. During the period of time in which only the two components A and B are eluted in a mixed form, the chromatogram trajectory lies on one plane spanned by the two axes of the characteristic orientation vector $\tau_1$ corresponding to the component A and the characteristic orientation vector $\tau_2$ corresponding to the component B in the SVD projection space (the first plane in FIG. 15). Similarly, during the period of time in which only the two components B and C are eluted in a mixed form, the chromatogram trajectory defines one plane spanned by the characteristic orientation vectors $\tau_2$ and $\tau_3$ which respectively correspond to the two components in the SVD projection space (the second plane in FIG. 15). The foregoing geometric discussion demonstrates that the direction of the basis vector of the second-eluted component B (characteristic orientation vector $\tau_2$) can be determined from the direction of the line of intersection between the first and second planes.

With the direction of the basis vector thus determined for each of the three components A, B and C, the peak separator 221 can geometrically analyze the chromatogram trajectory in the SVD projection space in the previously described manner to calculate the directions of the basis vectors corresponding to the individual components overlapping each other, and create the transformation matrix T(i, j) expressed by the following equation (4) based on the calculated result:

$$T(i, j) = \begin{pmatrix} \tau_{11} & \tau_{12} & \tau_{13} \\ \tau_{21} & \tau_{22} & \tau_{23} \\ \tau_{31} & \tau_{32} & \tau_{33} \end{pmatrix} \quad (4)$$

where $\tau_1=(\tau_{11}\ \tau_{12}\ \tau_{13})$, $\tau_2=(\tau_{21}\ \tau_{22}\ \tau_{23})$ and $\tau_3=(\tau_{31}\ \tau_{32}\ \tau_{33})$. By using this transformation matrix T(i, j), the peaks corresponding to the three components on the chromatogram and spectrum can be separated from each other.

Figure 16A:
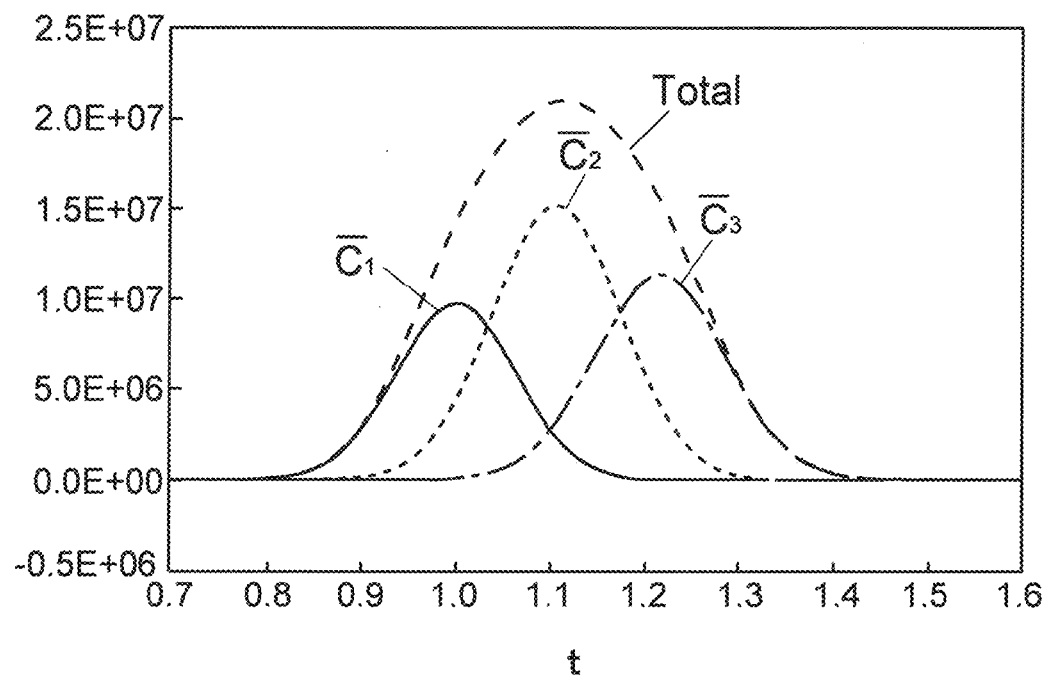
FIG. 16A illustrates the peak separation on a chromatogram obtained by using a transformation matrix determined from the chromatogram trajectory shown in FIG. 15.
Figure 16B:
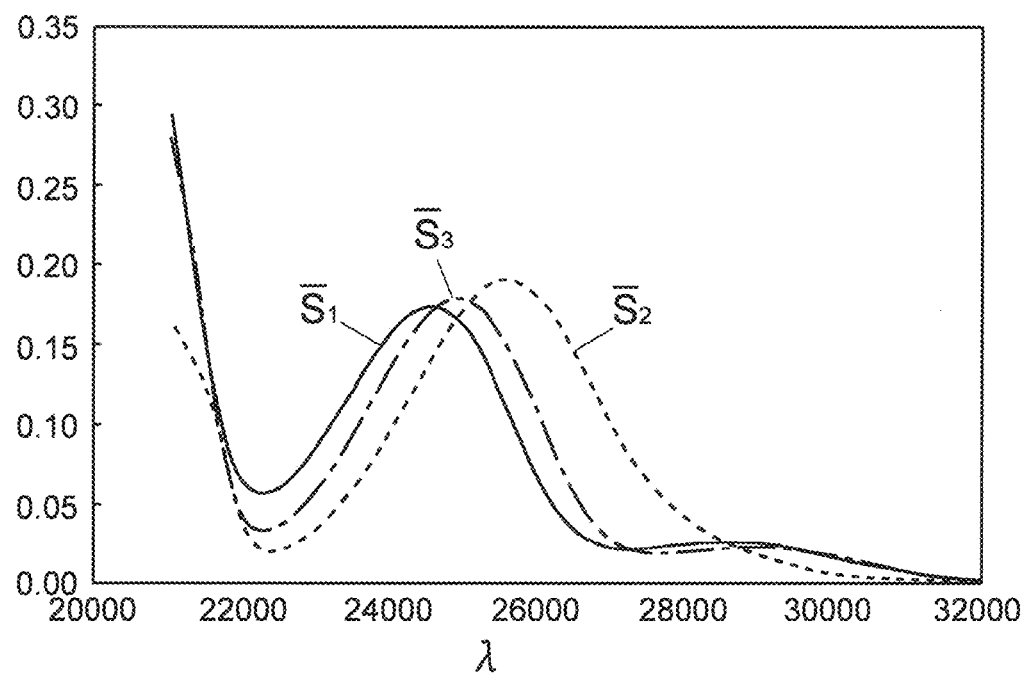
FIG. 16B illustrates the peak separation on a spectrum obtained by using a transformation matrix determined from the chromatogram trajectory shown in FIG. 15.

FIGS. 16A and 16B respectively show the peaks on the chromatogram and those on the spectrum separated from each other by using the transformation matrix calculated from the chromatogram trajectory shown in FIG. 15. Thus, the overlapping peaks of the three components can be appropriately separated, so that the peak information can be acquired for each component, and a correct qualitative and quantitative analysis can be performed.

[Another Example of Peak Separation Method for Three-Component Mixture]

As for the three-component mixture model, an analysis example in which the peak separation is poorer (the amount of overlap is greater) than in the previous example is hereinafter described.

Figure 17A:
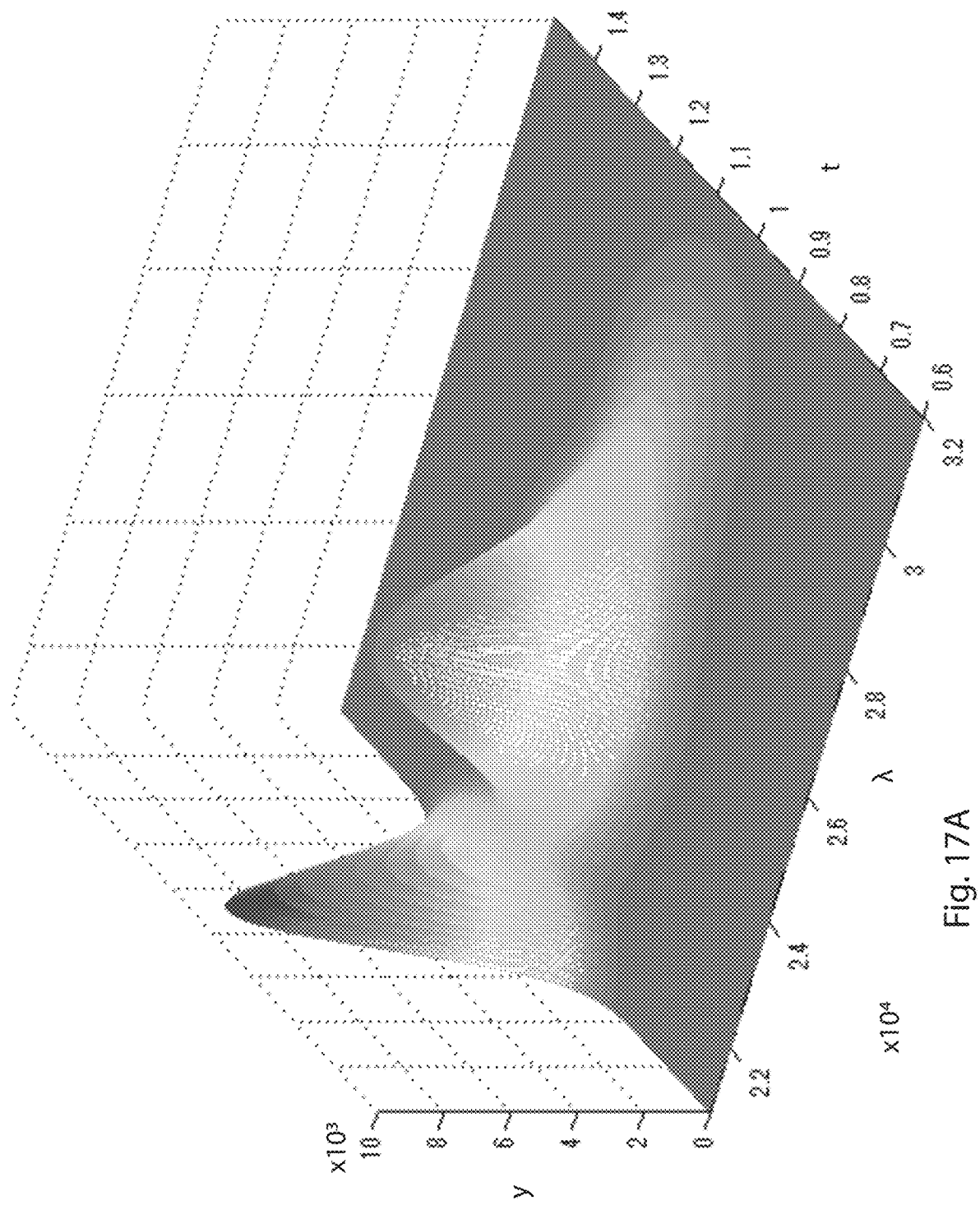
FIG. 17A shows a three-dimensional data in another example of the three-component mixture model.
Figure 17B:
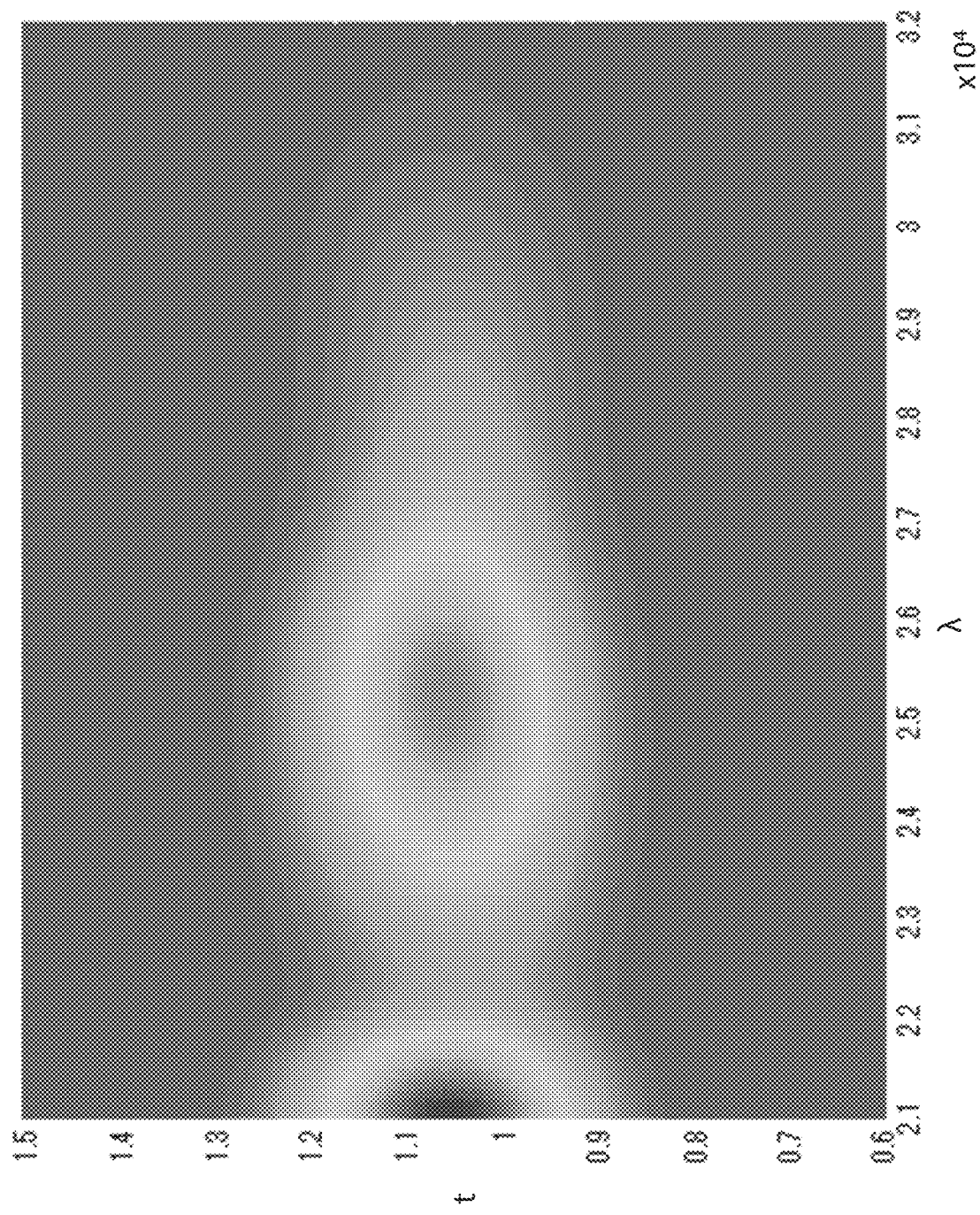
FIG. 17B shows a three-dimensional data in another example of the three-component mixture model.

FIGS. 17A and 17B show another example of the three-dimensional data of the three-component mixture model. As shown in FIG. 17B, the peaks in the present example are insufficiently separated on the temporal axis and appear to be a single peak.

Figure 18:
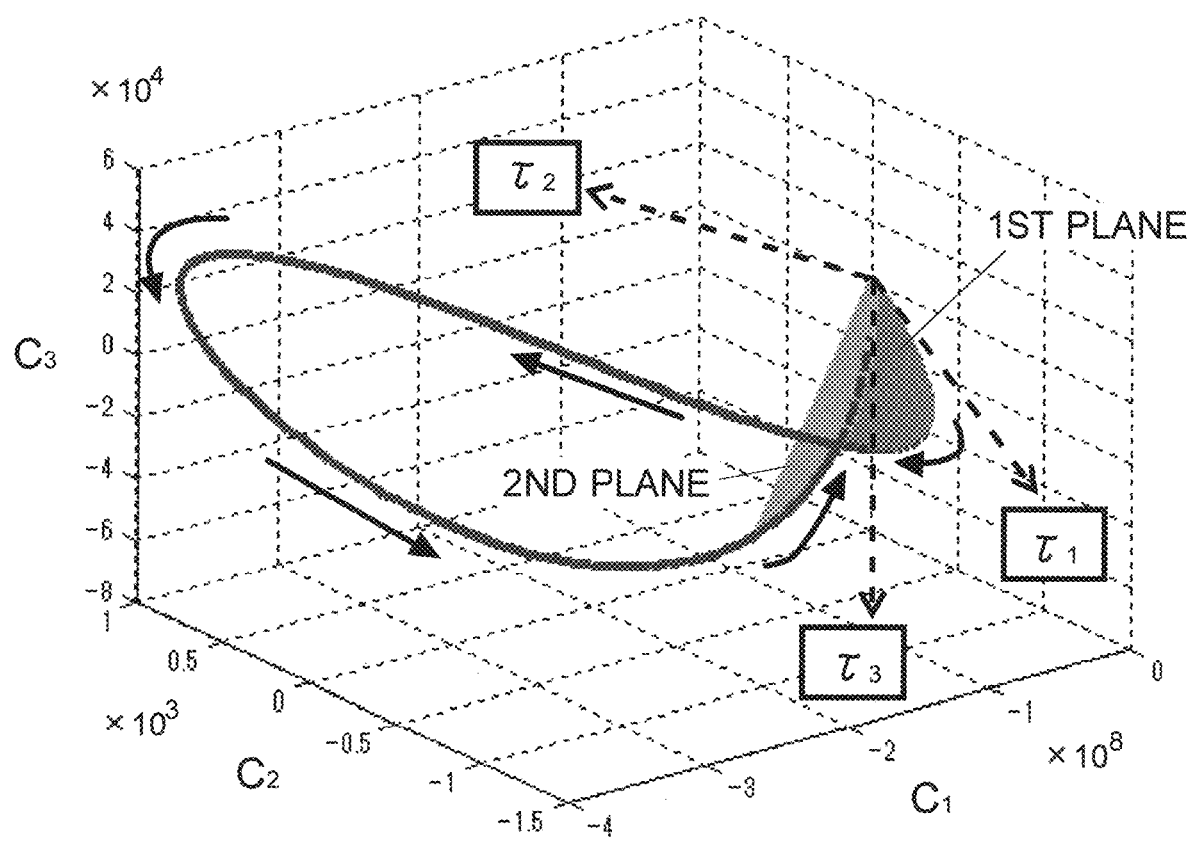
FIG. 18 shows a chromatogram trajectory in an SVD projection space obtained by performing the low rank approximation by singular value decomposition on the three-dimensional data shown in FIGS. 17A and 17B.

FIG. 18 shows a chromatogram trajectory in an SVD projection space obtained by performing the low rank approximation by singular value decomposition on the three-dimensional data. The behavior of the chromatogram trajectory obtained in the three-dimensional SVD projection space evidently shows that the chromatogram, which appears to be a single peak, actually contains contributions of the three components having different spectrum patterns (i.e. the described figure essentially has a three-dimensional form). In this example, an elution period in which only the single component is eluted is present for each of the two components A and C, although the period is rather short. Accordingly, in FIG. 18, the tangent to the curve of the chromatogram trajectory starting from point P indicates the direction of the basis vector of the single component A (characteristic orientation vector $\tau_1$), while the tangent to the curve of the chromatogram trajectory returning to point P indicates the direction of the basis vector of the single component C (characteristic orientation vector $\tau_3$).

The first plane on which the chromatogram trajectory lies within a period of time in which only the two components A and B are eluted in a mixed form, as well as the second plane on which the chromatogram trajectory lies within a period of time in which only the two components B and C are eluted in a mixed form, can be determined in the SVD projection space. Therefore, the direction of the basis vector of the second-eluted component B (characteristic orientation vector $\tau_2$) can be determined from the direction of the line of intersection between the first and second planes.

As described thus far, it is possible to determine the direction of the basis vector for each of the three components A, B and C, and create the transformation matrix T(i, j) based on the result.

Figure 19A:
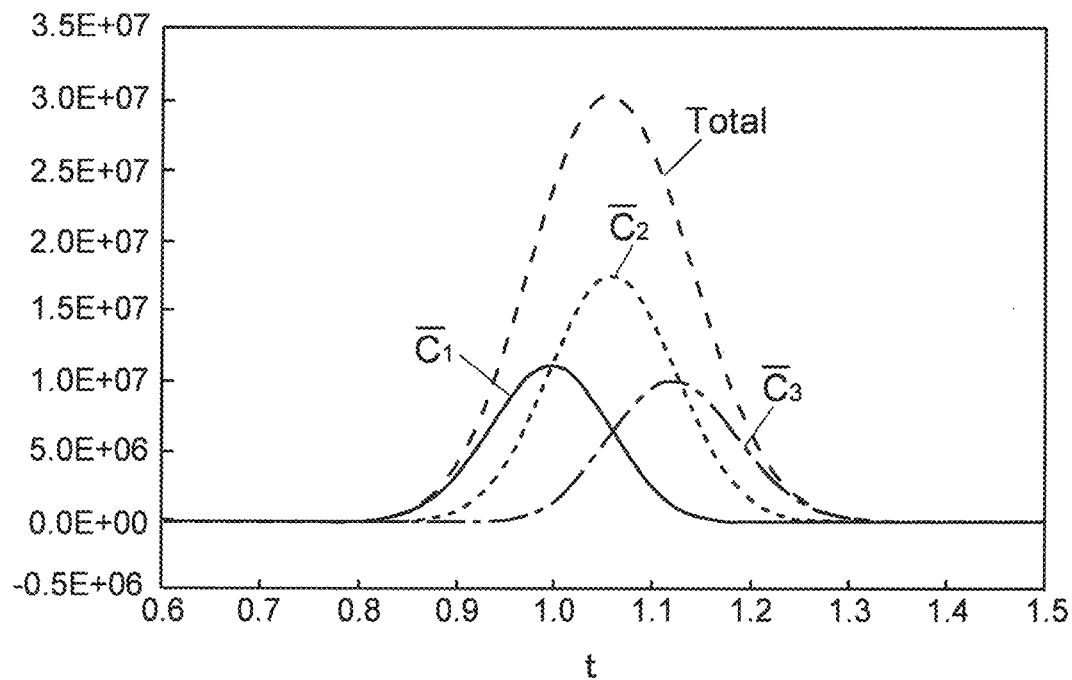
FIG. 19A illustrates the peak separation on a chromatogram and the peak separation on a spectrum obtained by using a transformation matrix determined from the chromatogram trajectory shown in FIG. 18.
Figure 19B:
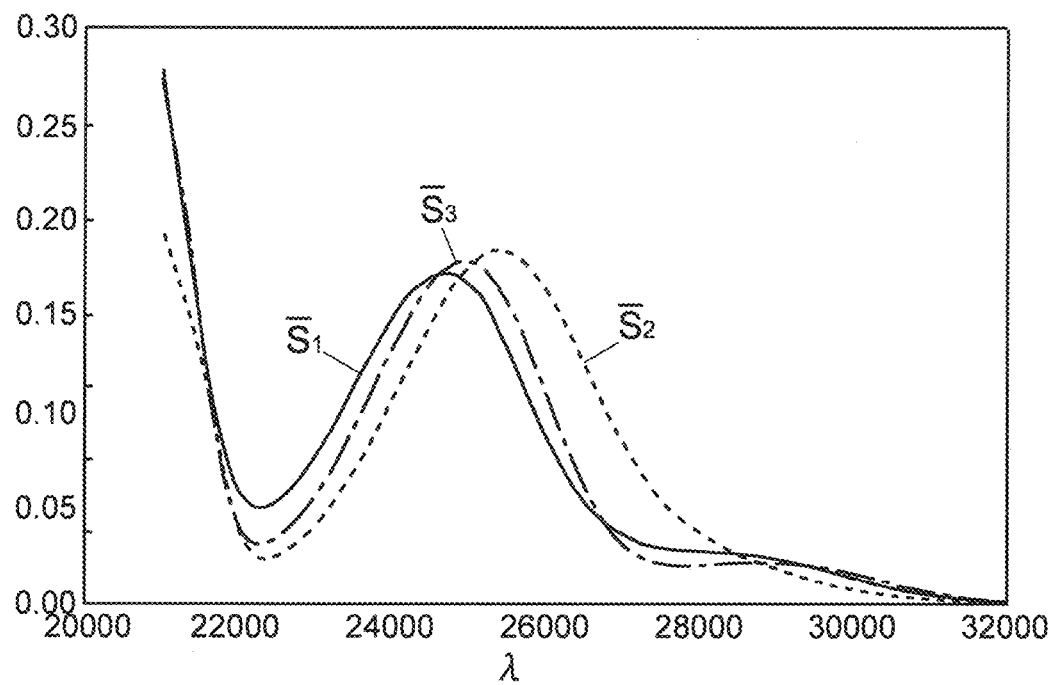
FIG. 19B illustrates the peak separation on a chromatogram and the peak separation on a spectrum obtained by using a transformation matrix determined from the chromatogram trajectory shown in FIG. 18.

FIGS. 19A and 19B respectively show the peaks on the chromatogram and those on the spectrum separated from each other by using the transformation matrix calculated from the chromatogram trajectory shown in FIG. 18. Thus, even if the state of separation is considerably poor, the overlapping peaks of the three components can be appropriately separated, so that the peak information can be acquired for each component, and a correct qualitative and quantitative analysis can be performed.

The descriptions thus far have been concerned with the case of the two-component mixture and that of the three-component mixture. Even in the case where four or more components are mixed together, it is theoretically possible to determine the direction of the basis vector for each component and create a transformation matrix based on the determined directions by geometrically analyzing the chromatogram trajectory in the signal subspace of four or more dimensions.

It is evident that the previously described embodiment is one example of the present invention, and any change, addition or modification appropriately made within the spirit of the present invention will fall within the scope of claims of the present application.

For example, although the previously described embodiment is concerned with the case where the peak analyzing method and waveform processing device according to the present invention are applied in an LC system including a PDA detector, it is evident that the present invention is also applicable in an LC system employing an ultraviolet-visible light detector capable of wavelength scan, or an LC-MS system employing a mass spectrometer as the detector. It is also evident that the present invention is applicable in a gas chromatograph system employing an infrared spectrum detector, or a GC-MS system employing a mass spectrometer as the detector. In those applications of the present invention, the first parameter is wavelength, wavenumber or mass-to-charge ratio, while the second parameter is time.

The first and second parameters are not limited to those types. For example, in the case of a GC×GC system or LC×LC system, a three-dimensional chromatogram in which both the first and second parameters are time can be acquired. The present invention is also applicable to this type of three-dimensional data.

The second parameter is not limited to time. Another possible example is position information. For example, in an imaging mass spectrometer, a set of mass spectrum data is acquired from each of the large number of measurement points located at spatially different positions. The present invention is also applicable in the processing of such a type of data.

In the case where a laser microdissection method is used for collecting samples, and an LC analysis is performed a large number of samples respectively obtained from a large number of measurement points located at spatially different positions, a chromatogram is acquired for each of the large number of measurement points. The present invention is also applicable in the processing of such a type of data.

[Various Modes]

A person skilled in the art can naturally understand that the illustrative embodiments described thus far are specific examples of the following modes of the present invention.

(Clause 1) One mode of the peak analyzing method according to the present invention is a peak analyzing method using a computer to process three-dimensional data obtained by acquiring a series of first signal waveforms representing a relationship between a first parameter and a signal intensity for a given set of changing second parameters, and to separate overlapping peaks observed in a second signal waveform representing a relationship between the second parameter and the signal intensity into a plurality of individual peaks originating from different factors based on signal patterns observed in a dimension of the first parameter, the peak analyzing method executing:

a singular value decomposition step configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition;

a transformation matrix acquisition step configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and a peak separation step configured to deconvolute signal waveforms in the first matrix of the dimension of the first parameter by the transformation matrix, and to separate peaks in the second signal waveform in the second matrix by the transformation matrix.

(Clause 7) One mode of the waveform processing device according to the present invention, which is a device employing the peak analyzing method described in Clause 1, is a waveform processing device configured to process three-dimensional data obtained by acquiring a series of first signal waveforms representing a relationship between a first parameter and a signal intensity for a given set of changing second parameters, and to separate overlapping peaks observed in a second signal waveform representing a relationship between the second parameter and the signal intensity into a plurality of individual peaks originating from different factors based on signal patterns observed in a dimension of the first parameter, the waveform processing device including:

a singular value decomposition processor configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition;

a transformation matrix acquirer configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and a peak separation calculator configured to deconvolute signal waveforms in the first matrix of the dimension of the first parameter by the transformation matrix, and to separate peaks in the second signal waveform in the second matrix by the transformation matrix.

In the peak analyzing method described in Clause 1 and the waveform processing device described in Clause 7, the task of separating peaks overlapping each other on a chromatogram, spectrum or other types of signal waveforms and extracting information for each individual peak can be performed without requiring the setting of complex parameters for the peak detection or peak separation, or without requiring a user to make a judgment or perform manual operations. Consequently, an efficient and highly accurate peak separation and peak detection can be achieved.

(Clauses 2 and 8) In one mode of the peak analyzing method described in Clause 1 and the waveform processing device described in Clause 7, the different factors are components in the sample, the first parameter is wavelength or mass-to-charge ratio, with the first signal waveform being a waveform spectrum or mass spectrum, and the second parameter is time, with the second signal waveform being a chromatogram.

By the peak analyzing method described in Clause 1 and the waveform processing device described in Clause 7, the peaks originating from a plurality of components overlapping each other on a waveform spectrum or mass spectrum, as well as the peaks originating from a plurality of components overlapping each other on a chromatogram, can be satisfactorily separated from each other in various types of devices, such as a liquid chromatograph system employing a PDA detector, ultraviolet-visible light detector or similar device as the detector, a liquid chromatograph mass spectrometer, a gas chromatograph system employing an infrared spectrum detector or similar device as the detector, or a gas chromatograph mass spectrometer. Therefore, for each peak corresponding to one component, the peak-top position can be accurately determined, and a correct identification of the component, i.e. the qualitative analysis can be performed. Furthermore, for each peak corresponding to one component, the area or height of the peak can be accurately determined, and the quantity of the component can be correctly determined from the area value or height value.

(Clause 3) In one mode of the peak analyzing method described in Clause 2, the transformation matrix acquisition step includes estimation of the characteristics orientations corresponding to a single component based on a shape analysis of the trajectory within a time period in which only the single component is present.

(Clause 9) In one mode of the waveform processing device described in Clause 8, the transformation matrix acquirer is configured to estimate the characteristics orientations corresponding to a single component based on a shape analysis of the trajectory within a time period in which only the single component is present.

Specifically, in the trajectory in the SVD projection space, when the section which is estimated to correspond to a period of time in which only a single component is present has a substantially curved shape, a tangent to the curve may be determined, and the orientation of the tangent may be considered as the characteristics orientation corresponding to that single component.

By the peak analyzing method described in Clause 3 and the waveform processing device described in Clause 9, the characteristics orientation corresponding to a single component can be easily and appropriately determined.

(Clause 4) In one mode of the peak analyzing method described in Clause 3, the peak separation is carried out for a peak in which first, second and third components are mixed together, and under a condition that the peak includes a first time period in which only the first component is present, a second time period in which the first component and the second component only are mixed together, a third time period in which the three components are mixed together, a fourth time period in which the second component and the third component only are mixed together, as well as a fifth time period in which only the third component is present, the transformation matrix acquisition step includes estimation of the characteristic orientation corresponding to the second component from a line intersection between a plane defined by a section of the trajectory which corresponds to the first and second time periods, and a plane defined by a section of the trajectory which corresponds to the fourth and fifth time periods.

(Clause 10) In one mode of the waveform processing device described in Clause 9, the peak separation carried out for a peak in which first, second and third components are mixed together, and under a condition that the peak includes a first time period in which only the first component is present, a second time period in which the first component and the second component only are mixed together, a third time period in which the three components are mixed together, a fourth time period in which the second component and the third component only are mixed together, as well as a fifth time period in which only the third component is present, the transformation matrix acquirer estimates the characteristic orientation corresponding to the second component from a line intersection between a plane defined by a section of the trajectory which corresponds to the first and second time periods, and a plane obtained by a section of the trajectory which corresponds to the fourth and fifth time periods.

The directions of the basis vectors which respectively correspond to the first and third components can be determined from the shapes of the sections of the trajectory which are estimated to correspond to the first period of time and the fifth period of time, respectively, using the peak analyzing method described in Clause 3.

By the peak analyzing method described in Clause 4 and the waveform processing device described in Clause 10, when three components are mixed together in a peak, the characteristics orientation which respectively correspond to the three components can be easily and appropriately determined.

(Clause 5) Another mode of the peak analyzing method according to the present invention is a peak analyzing method using a computer to process three-dimensional data obtained by acquiring a series of first signal waveforms representing a relationship between a first parameter and a signal intensity for a given set of changing second parameters, and to determine a purity of a peak observed in a second signal waveform representing a relationship between the second parameter and the signal intensity, wherein the peak analyzing method executes:
 a singular value decomposition step configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition; and
 a component number estimation step configured to estimate a number of components contributing to the peak from a behavior of a trajectory in an SVD projection space whose number of dimensions is equal to the lowered rank, and which is described by the plurality of weighting vectors.

(Clause 11) Another mode of the waveform processing device according to the present invention, which is a device employing the peak analyzing method described in Clause 5, is a waveform processing device configured to process three-dimensional data obtained by acquiring a series of first signal waveforms representing a relationship between a first parameter and a signal intensity for a given set of changing second parameters, and to determine a purity of a peak observed in a second signal waveform representing a relationship between the second parameter and the signal intensity, the waveform processing device comprising:
 a singular value decomposition processor configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition; and
 a component number estimator configured to estimate a number of components contributing to the peak from a behavior of a trajectory in an SVD projection space whose number of dimensions is equal to the lowered rank, and which is described by the plurality of weighting vectors.

(Clause 6) In one mode of the peak analyzing method described in Clause 5, the first parameter is wavelength or mass-to-charge ratio, with the first signal waveform being a waveform spectrum or mass spectrum, and the second parameter is time, with the second signal waveform being a chromatogram.

(Clause 12) Similarly, in one mode of the waveform processing device described in Clause 11, the first parameter is wavelength or mass-to-charge ratio, with the first signal waveform being a waveform spectrum or mass spectrum, and the second parameter is time, with the second signal waveform being a chromatogram.

In the peak analyzing methods described in Clauses 5 and 6, as well as the waveform processing devices described in Clauses 11 and 12, whether an apparently single peak on a chromatogram, spectrum or other types of signal waveforms has originated from a single component or a plurality of components can be accurately determined without requiring the setting of complex parameters for the peak detection or peak-purity determination, or without requiring a user to make a judgment or perform manual operations. Consequently, an efficient and highly accurate peak-purity determination can be achieved.

REFERENCE SIGNS LIST

10 . . . Measurement Unit
11 . . . Mobile Phase Container
12 . . . Liquid-Supply Pump
13 . . . Injector
14 . . . Column
15 . . . PDA Detector
20 . . . Data Analyzing Unit
21 . . . Data Collector
22 . . . Waveform Processor
221 . . . Peak Separator
222 . . . Peak Determiner
23 . . . Qualitative-Quantitative Analyzer
24 . . . Input Unit
25 . . . Display Unit

The invention claimed is:
1. A peak analyzing method using a computer to process three-dimensional data obtained by acquiring a series of first signal waveforms representing a relationship between a first parameter and a signal intensity for a given set of changing second parameters, and to separate overlapping peaks observed in a second signal waveform representing a rela- tionship between the second parameter and the signal intensity into a plurality of individual peaks originating from different factors based on signal patterns observed in a dimension of the first parameter, wherein the peak analyzing method executes:

a singular value decomposition (SVD) step configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition;

a transformation matrix acquisition step configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and a peak separation step configured to deconvolute signal waveforms in the first matrix of the dimension of the first parameter by the transformation matrix, and to separate peaks in the second signal waveform in the second matrix by the transformation matrix.

2. The peak analyzing method according to claim 1, wherein the different factors are components in the sample, the first parameter is wavelength or mass-to-charge ratio, with the first signal waveform being a waveform spectrum or mass spectrum, and the second parameter is time, with the second signal waveform being a chromatogram.

3. The peak analyzing method according to claim 2, wherein the transformation matrix acquisition step includes estimation of the characteristics orientations corresponding to a single component based on a shape analysis of the trajectory within a time period in which only the single component is present.

4. The peak analyzing method according to claim 3, wherein the peak separation is carried out for a peak in which first, second and third components are mixed together, and under a condition that the peak includes a first time period in which only the first component is present, a second time period in which the first component and the second component only are mixed together, a third time period in which the three components are mixed together, a fourth time period in which the second component and the third component only are mixed together, as well as a fifth time period in which only the third component is present, the transformation matrix acquisition step includes estimation of the characteristic orientation corresponding to the second component from a line intersection between a plane defined by a section of the trajectory which corresponds to the first and second time periods, and a plane defined by a section of the trajectory which corresponds to the fourth and fifth time periods.

5. The peak analyzing method according to claim 1, wherein the peak analyzing method further executes:

a component number estimation step configured to estimate a number of components contributing to the peak from a behavior of the trajectory in the SVD projection space.

6. The peak analyzing method according to claim 5, wherein the first parameter is wavelength or mass-to-charge ratio, with the first signal waveform being a waveform spectrum or mass spectrum, and the second parameter is time, with the second signal waveform being a chromatogram.

7. A waveform processing device configured to process three-dimensional data obtained by acquiring a series of first signal waveforms representing a relationship between a first parameter and a signal intensity for a given set of changing second parameters, and to separate overlapping peaks observed in a second signal waveform representing a relationship between the second parameter and the signal intensity into a plurality of individual peaks originating from different factors based on signal patterns observed in a dimension of the first parameter, the waveform processing device comprising:

a singular value decomposition (SVD) processor configured to perform singular value decomposition on an input matrix expressing three-dimensional data to be processed, and to determine a first matrix representing a plurality of basis vectors related to the first parameter and a second matrix representing a plurality of weighting vectors related to the second parameter, where the first matrix and the second matrix have a lowered rank than the input matrix based on singular values obtained by the singular value decomposition;

a transformation matrix acquirer configured to estimate characteristic orientations within a space spanned by the plurality of basis vectors by performing a geometric analysis on a trajectory defined by the plurality of weighting vectors in an SVD projection space whose number of dimensions is equal to the lowered rank given by a singular value decomposition process, and to determine a transformation matrix containing relevant information of the characteristic orientations; and a peak separation calculator configured to deconvolute signal waveforms in the first matrix of the dimension of the first parameter by the transformation matrix, and to separate peaks in the second signal waveform in the second matrix by the transformation matrix.

8. The waveform processing device according to claim 7, wherein the different factors are components in the sample, the first parameter is wavelength or mass-to-charge ratio, with the first signal waveform being a waveform spectrum or mass spectrum, and the second parameter is time, with the second signal waveform being a chromatogram.

9. The waveform processing device according to claim 8, wherein the transformation matrix acquirer is configured to estimate the characteristics orientations corresponding to a single component based on a shape analysis of the trajectory within a time period in which only the single component is present.

10. The waveform processing device according to claim 9, wherein the peak separation is carried out for a peak in which first, second and third components are mixed together, and under a condition that the peak includes a first time period in which only the first component is present, a second time period in which the first component and the second component only are mixed together, a third time period in which the three components are mixed together, a fourth time period in which the second component and the third component only are mixed together, as well as a fifth time period in which only the third component is present, the transformation matrix acquirer estimates the characteristic orientation corresponding to the second component from a line intersection between a plane defined by a section of the trajectory which corresponds to the first and second time periods, and a plane obtained by a section of the trajectory which corresponds to the fourth and fifth time periods.

11. The waveform processing device according to claim 7, further comprising:
   a component number estimator configured to estimate a number of components contributing to the peak from a behavior of the trajectory in the SVD projection space.

12. The waveform processing device according to claim 11, wherein the first parameter is wavelength or mass-to-charge ratio, with the first signal waveform being a waveform spectrum or mass spectrum, and the second parameter is time, with the second signal waveform being a chromatogram.

* * * * *